US012538082B2

(12) United States Patent
Vastare et al.

(10) Patent No.: US 12,538,082 B2
(45) Date of Patent: Jan. 27, 2026

(54) CAPTURE OF CONTEXT STATISTICS IN HEARING INSTRUMENTS

(71) Applicant: Starkey Laboratories, Inc., Eden Prairie, MN (US)

(72) Inventors: Krishna Vastare, Eden Prairie, MN (US); Martin McKinney, Minneapolis, MN (US); Kenneth Jensen, Brunswick, MD (US); Lue Du, Hamel, MN (US); Jingjing Xu, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 238 days.

(21) Appl. No.: 18/327,514

(22) Filed: Jun. 1, 2023

(65) Prior Publication Data

US 2023/0396938 A1 Dec. 7, 2023

Related U.S. Application Data

(60) Provisional application No. 63/365,986, filed on Jun. 7, 2022.

(51) Int. Cl.
*H04R 25/00* (2006.01)

(52) U.S. Cl.
CPC ......... *H04R 25/50* (2013.01); *H04R 2225/41* (2013.01)

(58) Field of Classification Search
CPC ............................ H04R 25/50; H04R 2225/41
See application file for complete search history.

(56) References Cited

U.S. PATENT DOCUMENTS 7,738,667 B2 6/2010 Bramsløw et al.
8,457,335 B2 6/2013 Imamura et al.
(Continued)

FOREIGN PATENT DOCUMENTS

EP 2328363 B1 5/2016
WO 2020084342 A1 4/2020
(Continued)

OTHER PUBLICATIONS

Response to Extended Search Report dated Oct. 26, 2023, from counterpart European Application No. 23178016.4 filed May 28, 2024, 115 pp.
(Continued)

*Primary Examiner* — Suhan Ni
(74) *Attorney, Agent, or Firm* — Shumaker & Sieffert, P.A.

(57) ABSTRACT

A method comprises determining, based on signals from sensors of hearing instruments, current values of context parameters; determining, based on the current values of the context parameters, that a current context of the hearing instruments has changed or is likely to change from a first to a second context of a plurality of contexts, wherein each of the contexts corresponds to a different unique combination of potential values of the context parameters; updating statistics of the contexts, wherein for each of the contexts, the statistics of the context include statistics with respect to time the hearing instruments spent in the context; and based on the determination that the current context of the hearing instruments has changed or is likely to change from the first context to the second context, initiating, based on the statistics of at least one of the first or second contexts, one or more actions.

18 Claims, 8 Drawing Sheets

(56) References Cited

U.S. PATENT DOCUMENTS

| | | | | |
|---|---|---|---|---|
| 10,034,102 | B2 | 7/2018 | Zhang et al. | |
| 10,117,032 | B2 | 10/2018 | Gordon et al. | |
| 10,764,226 | B2 | 9/2020 | Goldstein | |
| 2009/0074216 | A1* | 3/2009 | Bradford | H04R 25/43 381/315 |
| 2012/0328118 | A1* | 12/2012 | Pedersen | H04R 25/453 381/71.11 |
| 2013/0322668 | A1 | 12/2013 | Zhang et al. | |
| 2014/0314261 | A1* | 10/2014 | Selig | H04R 25/70 381/314 |
| 2015/0326965 | A1* | 11/2015 | Sprague | H04R 25/405 381/317 |
| 2019/0069107 | A1 | 2/2019 | Gandhi et al. | |
| 2019/0122125 | A1 | 4/2019 | Dragicevic et al. | |
| 2019/0149927 | A1 | 5/2019 | Zhang et al. | |
| 2019/0274596 | A1 | 9/2019 | Boven et al. | |

FOREIGN PATENT DOCUMENTS

| | | | |
|---|---|---|---|
| WO | 2020174324 | A1 | 9/2020 |
| WO | 2020206155 | A1 | 10/2020 |
| WO | 2021127228 | A1 | 6/2021 |
| WO | 2023283569 | A1 | 1/2023 |
| WO | 2023028122 | A1 | 3/2023 |

OTHER PUBLICATIONS

Extended Search Report from counterpart European Application No. 23178016.4 dated Oct. 26, 2023, 6 pp.

Communication pursuant to Article 94(3) EPC from counterpart European Application No. 23178016.4 dated Nov. 14, 2025, 5 pp.

* cited by examiner

500

502 504

| Context | | | | | Long term statistics | | | |
|---|---|---|---|---|---|---|---|---|
| *Acoustic* | *Activity* | *Own voice* | *Emotion* | *EEG* | *Mean time spent in context* | *Variance of time spent in context* | *Min time spent in context* | *Max time spent in context* |
| Loud restaurant | Sitting | Yes | Happy | Active | | | | |
| Wind noise | Walking | No | Tired | Active | | | | |
| | | | | | | | | |

506

FIG. 5

700

| Previous class → Next class | AEM 1, AM 1 | AEM 1, AM 2 | ●●● | AEM 2, AM 1 | AEM 2, AM 2 | ●●● | AEM m, AM n |
|---|---|---|---|---|---|---|---|
| AEM 1, AM 1 | ... | | | | | | |
| AEM 1, AM 2 | | ... | | | | | |
| ●●● | | | ... | | | ... | |
| AEM 1, AM n | | | | ... | | | |
| AEM 2, AM 1 | | | | | ... | | ... |
| AEM 2, AM 2 | | | | | ... | | ... |
| ●●● | | | | | ... | | ... |
| AEM m, AM n | | | | | ... | | ... |

FIG. 7

CAPTURE OF CONTEXT STATISTICS IN HEARING INSTRUMENTS

This application claims the benefit of U.S. Provisional Patent Application 63/365,986, filed Jun. 7, 2022, the entire content of which is incorporated by reference.

TECHNICAL FIELD

This disclosure relates to hearing instruments.

BACKGROUND

Hearing instruments are devices designed to be worn on, in, or near one or more of a user's ears. Common types of hearing instruments include hearing assistance devices (e.g., "hearing aids"), earphones, headphones, hearables, and so on. Some hearing instruments include features in addition to or in the alternative to environmental sound amplification. For example, some modern hearing instruments include advanced audio processing for improved device functionality, controlling and programming the devices, and beamforming, and some can communicate wirelessly with external devices including other hearing instruments (e.g., for streaming media).

SUMMARY

This disclosure describes techniques relating to the collection and use of statistics regarding contexts in hearing instruments. As described herein, a processing system may determine, based on signals from one or more sensors of one or more hearing instruments, current values of a plurality of context parameters. Additionally, the processing system may determine, based on the current values of the plurality of context parameters, that a current context of the one or more hearing instruments has changed. Each context in the plurality of contexts may correspond to a different unique combination of potential values of the plurality of context parameters. The processing system may update statistics of the contexts. For each context of the plurality of contexts, the statistics of the context may include statistics with respect to time the one or more hearing instruments spent in the context. In some examples, the processing system may maintain a context switching table that may indicate the numbers of times the one or more hearing instruments switch between different contexts.

The processing system may use the statistics of the contexts and context switching tables for a variety of purposes. For example, based on the determination that the current context of the one or more hearing instruments has changed from the first context to the second context, the one or more processors may determine, based on the statistics of the second context whether to change current output settings of the one or more hearing instruments to output settings associated with the second context. In some examples, the processing system may use the statistics of the contexts for suggesting use or purchase of accessories for the hearing instruments.

As described herein, this disclosure describes a method comprising: determining, by one or more processors of a processing system, based on signals from one or more sensors of one or more hearing instruments, current values of a plurality of context parameters, wherein the processors are implemented in circuitry; determining, by the one or more processors, based on the current values of the plurality of context parameters, that a current context of the one or more hearing instruments has changed or is likely to change from a first context of a plurality of contexts to a second context of the plurality of contexts, wherein each context in the plurality of contexts corresponds to a different unique combination of potential values of the plurality of context parameters; updating, by the one or more processors, statistics of the contexts, wherein for each context of the plurality of contexts, the statistics of the context include statistics with respect to time the one or more hearing instruments spent in the context; and based on the determination that the current context of the one or more hearing instruments has changed or is likely to change from the first context to the second context, initiating, by the one or more processors, based on the statistics of at least one of the first or second contexts, one or more actions.

In another example, this disclosure describes a system comprising: one or more storage devices configured to store data based on signals from one or more sensors of one or more hearing instruments; and a processing system comprising one or more processors configured to: determine, based on data based on the signals from the one or more sensors of the one or more hearing instruments, current values of a plurality of context parameters, wherein the processors are implemented in circuitry; determine, based on the current values of the plurality of context parameters, that a current context of the one or more hearing instruments has changed or is likely to change from a first context of a plurality of contexts to a second context of the plurality of contexts, wherein each context in the plurality of contexts corresponds to a different unique combination of potential values of the plurality of context parameters; update statistics of the contexts, wherein for each context of the plurality of contexts, the statistics of the context include statistics with respect to time the one or more hearing instruments spent in the context; and based on the determination that the current context of the one or more hearing instruments has changed or is likely to change from the first context to the second context, initiate, based on the statistics of at least one of the first or second contexts, one or more actions.

In another example, this disclosure describes a non-transitory computer-readable storage medium having instructions stored thereon that, when executed cause one or more processors to: determine, based on signals from one or more sensors of one or more hearing instruments, current values of a plurality of context parameters, wherein the processors are implemented in circuitry; determine, based on the current values of the plurality of context parameters, that a current context of the one or more hearing instruments has changed or is likely to change from a first context of a plurality of contexts to a second context of the plurality of contexts, wherein each context in the plurality of contexts corresponds to a different unique combination of potential values of the plurality of context parameters; update, statistics of the contexts, wherein for each context of the plurality of contexts, the statistics of the context include statistics with respect to time the one or more hearing instruments spent in the context; and based on the determination that the current context of the one or more hearing instruments has changed or is likely to change from the first context to the second context, initiate, based on the statistics of at least one of the first or second contexts, one or more actions.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIG. 5 is a conceptual diagram illustrating an example table for storing statistics regarding time spent in contexts, in accordance with one or more aspects of this disclosure.

FIG. 7 is a conceptual diagram illustrating a second example context transition table for storing statistics regarding transitions between in contexts, in accordance with one or more aspects of this disclosure.

DETAILED DESCRIPTION

Figure 1:
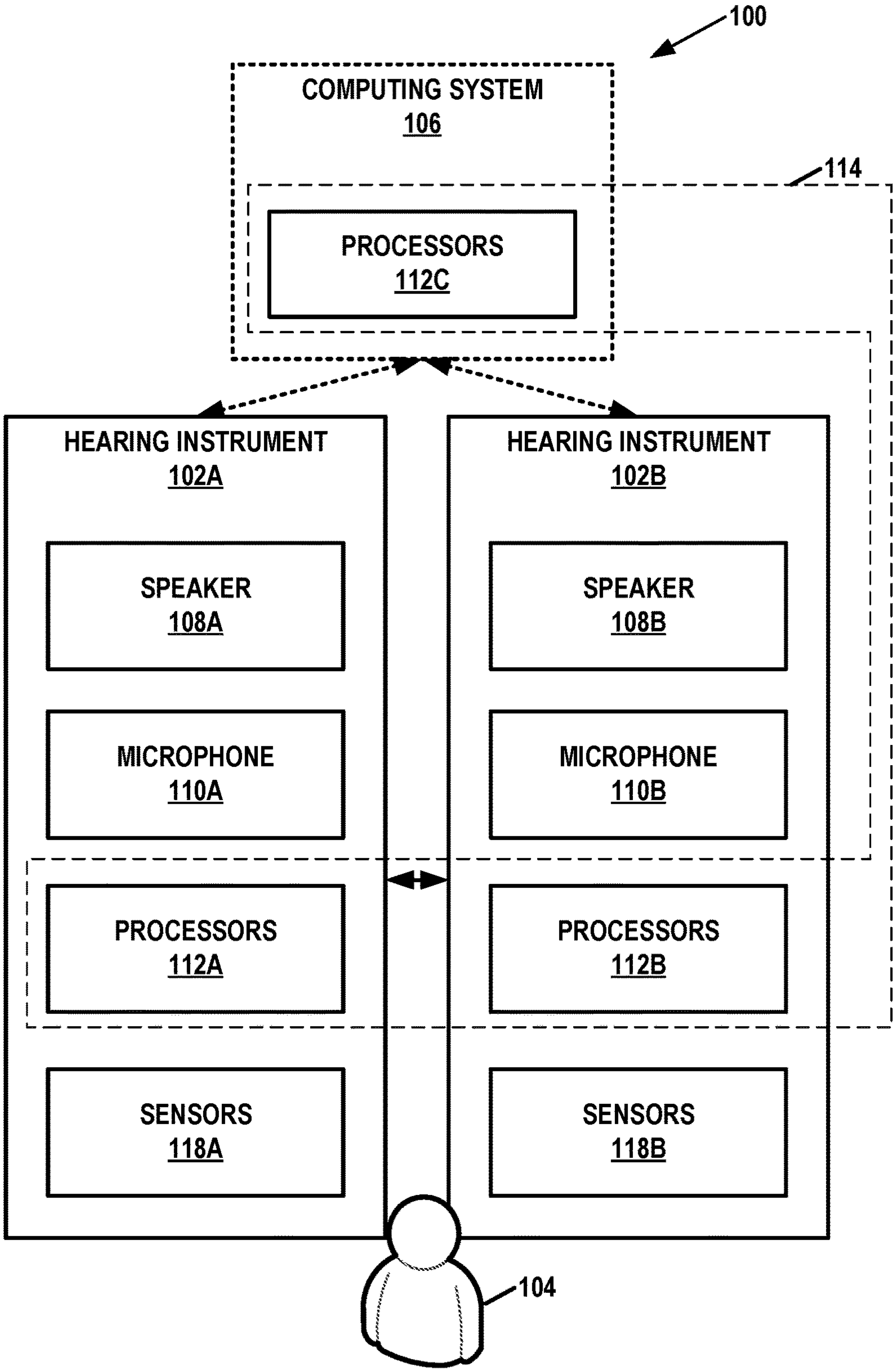
FIG. 1 is a conceptual diagram illustrating an example system that includes one or more hearing instruments, in accordance with one or more aspects of this disclosure.

Hearing instruments, such as hearing aids, have configurable output settings. The output settings may include overall output gain, output gain for specific frequency bands, noise canceling, and so on. It may be advantageous for a hearing instrument to use different output settings in different acoustic environments. For example, it may be advantageous to use a first set of output settings when a user of the hearing instrument is in a noisy restaurant, to use a second set of output settings when the user of the hearing instrument is experiencing windy conditions, to user a third set of output settings when the user of the hearing instrument is in a quiet acoustic environment, and so on. Accordingly, some hearing instruments have been designed to automatically transition between output settings based on a current acoustic environment of the user.

However, the user's experience may be improved if there are different output settings for more complex contexts. For example, there may be one set of output settings for situations in which the user is running while experiencing windy conditions and another set of output settings for situations in which the user is running while not experiencing windy conditions (e.g., the user is running on a treadmill). In another example, the user may refer output settings with a higher gain while watching television. Moreover, the user may prefer more or less noise reduction in different contexts, e.g., for increased comfort or increased intelligibility in conversations. While increasing the complexity of contexts may have advantages due to the ability to select a more appropriate set of output settings, doing so may increase the likelihood of transitioning between sets of output settings in an undesired way that diminishes user satisfaction with the hearing instruments.

This disclosure describes techniques that may address this issue. In accordance with one or more techniques of this disclosure, a processing system may determine, based on signals from one or more sensors of one or more hearing instruments, current values of a plurality of context parameters. The processing system may determine, based on the current values of the plurality of context parameters, that a current context of the one or more hearing instruments has changed from a first context of a plurality of contexts to a second context of the plurality of contexts. Each context in the plurality of contexts may correspond to a different unique combination of potential values of the plurality of context parameters. Furthermore, the processing system may update statistics of the contexts. For each context of the plurality of contexts, the statistics of the context include statistics with respect to time the one or more hearing instruments spent in the context. In some examples, in response to a determination that the current context of the one or more hearing instruments has changed from the first context to the second context, the processing system may determine, based on the statistics of at least one of the first or second contexts whether to change current output settings of the one or more hearing instruments to output settings associated with the second context. Because the processing system determines whether to change the current output settings of the one or more hearing instruments based on the statistics of the second context, the process of switching output settings may be more accurate and may lead to a better experience for the user of the one or more hearing instruments.

FIG. 1 is a conceptual diagram illustrating an example system 100 that includes hearing instruments 102A, 102B, in accordance with one or more aspects of this disclosure. This disclosure may refer to hearing instruments 102A and 102B collectively, as "hearing instruments 102." A user 104 may wear hearing instruments 102. In some instances, user 104 may wear a single hearing instrument. In other instances, the user may wear two hearing instruments, with one hearing instrument for each ear of user 104.

Hearing instruments 102 may comprise one or more of various types of devices that are configured to provide auditory stimuli to user 104 and that are designed for wear and/or implantation at, on, or near an ear of user 104. Hearing instruments 102 may be worn, at least partially, in the ear canal or concha. In any of the examples of this disclosure, each of hearing instruments 102 may comprise a hearing assistance device. Hearing assistance devices may include devices that help a user hear sounds in the user's environment. Example types of hearing assistance devices may include hearing aid devices, Personal Sound Amplification Products (PSAPs), and so on. In some examples, hearing instruments 102 are over-the-counter, direct-to-consumer, or prescription devices. Furthermore, in some examples, hearing instruments 102 include devices that provide auditory stimuli to user 104 that correspond to artificial sounds or sounds that are not naturally in the user's environment, such as recorded music, computer-generated sounds, sounds from a microphone remote from the user, or other types of sounds. For instance, hearing instruments 102 may include so-called "hearables," earbuds, earphones, or other types of devices. Some types of hearing instruments provide auditory stimuli to user 104 corresponding to sounds from the user's environment and also artificial sounds. In some examples, hearing instruments 102 may include cochlear implants. In some examples, hearing instruments 102 may use a bone conduction pathway to provide auditory stimulation.

In some examples, one or more of hearing instruments 102 includes a housing or shell that is designed to be worn in the ear for both aesthetic and functional reasons and encloses the electronic components of the hearing instrument. Such hearing instruments may be referred to as in-the-ear (ITE), in-the-canal (ITC), completely-in-the-canal (CIC), or invisible-in-the-canal (IIC) devices. In some examples, one or more of hearing instruments 102 may be behind-the-ear (BTE) devices, which include a housing worn behind the ear that contains electronic components of the hearing instrument, including the receiver (e.g., a speaker). The receiver conducts sound to an earbud inside the ear via an audio tube. In some examples, one or more of hearing instruments 102 may be receiver-in-canal (RIC) hearing-assistance devices, which include a housing worn behind the ear that contains electronic components and a housing worn in the ear canal that contains the receiver.

Hearing instruments 102 may implement a variety of features that help user 104 hear better. For example, hearing instruments 102 may amplify the intensity of incoming sound, amplify the intensity of incoming sound at certain frequencies, translate or compress frequencies of the incoming sound, and/or perform other functions to improve the hearing of user 104. In some examples, hearing instruments 102 may implement a directional processing mode in which hearing instruments 102 selectively amplify sound originating from a particular direction (e.g., to the front of user 104) while potentially fully or partially canceling sound originating from other directions. In other words, a directional processing mode may selectively attenuate off-axis unwanted sounds. The directional processing mode may help users understand conversations occurring in crowds or other noisy environments. In some examples, hearing instruments 102 may use beamforming or directional processing cues to implement or augment directional processing modes.

In some examples, hearing instruments 102 may reduce noise by canceling out or attenuating certain frequencies. Furthermore, in some examples, hearing instruments 102 may help user 104 enjoy audio media, such as music or sound components of visual media, by outputting sound based on audio data wirelessly transmitted to hearing instruments 102.

Hearing instruments 102 may be configured to communicate with each other. For instance, in any of the examples of this disclosure, hearing instruments 102 may communicate with each other using one or more wireless communication technologies. Example types of wireless communication technology include Near-Field Magnetic Induction (NFMI) technology, 900 MHz technology, a BLUETOOTH™ technology, WI-FI™ technology, audible sound signals, ultrasonic communication technology, infrared communication technology, inductive communication technology, or another type of communication that does not rely on wires to transmit signals between devices. In some examples, hearing instruments 102 use a 2.4 GHz frequency band for wireless communication. In examples of this disclosure, hearing instruments 102 may communicate with each other via non-wireless communication links, such as via one or more cables, direct electrical contacts, and so on.

As shown in the example of FIG. 1, system 100 may also include a computing system 106. In other examples, system 100 does not include computing system 106. Computing system 106 comprises one or more computing devices, each of which may include one or more processors. For instance, computing system 106 may comprise one or more mobile devices, server devices, personal computer devices, handheld devices, wireless access points, smart speaker devices, smart televisions, medical alarm devices, smart key fobs, smartwatches, smartphones, motion or presence sensor devices, smart displays, screen-enhanced smart speakers, wireless routers, wireless communication hubs, prosthetic devices, mobility devices, special-purpose devices, accessory devices, and/or other types of devices.

Accessory devices may include devices that are configured specifically for use with hearing instruments 102. Example types of accessory devices may include charging cases for hearing instruments 102, storage cases for hearing instruments 102, media streamer devices, phone streamer devices, external microphone devices, remote controls for hearing instruments 102, and other types of devices specifically designed for use with hearing instruments 102. Actions described in this disclosure as being performed by computing system 106 may be performed by one or more of the computing devices of computing system 106. One or more of hearing instruments 102 may communicate with computing system 106 using wireless or non-wireless communication links. For instance, hearing instruments 102 may communicate with computing system 106 using any of the example types of communication technologies described elsewhere in this disclosure.

Furthermore, in the example of FIG. 1, hearing instrument 102A includes a speaker 108A, a microphone 110A, a set of one or more processors 112A, and sensors 118A. Hearing instrument 102B includes a speaker 108B, a microphone 110B, a set of one or more processors 112B, and sensors 118B. This disclosure may refer to speaker 108A and speaker 108B collectively as "speakers 108." This disclosure may refer to microphone 110A and microphone 110B collectively as "microphones 110." Computing system 106 includes a set of one or more processors 112C. Processors 112C may be distributed among one or more devices of computing system 106. This disclosure may refer to processors 112A, 112B, and 112C collectively as "processors 112." Processors 112 may be implemented in circuitry and may comprise microprocessors, application-specific integrated circuits, digital signal processors, or other types of circuits.

As noted above, hearing instruments 102A, 102B, and computing system 106 may be configured to communicate with one another. Accordingly, processors 112 may be configured to operate together as a processing system 114. Thus, discussion in this disclosure of actions performed by processing system 114 may be performed by one or more processors in one or more of hearing instrument 102A, hearing instrument 102B, or computing system 106, either separately or in coordination.

Hearing instruments 102 and computing system 106 may include components in addition to those shown in the example of FIG. 1. For instance, each of hearing instruments 102 may include one or more additional microphones configured to detect sound in an environment of user 104. The additional microphones may include omnidirectional microphones, directional microphones, or other types of microphones.

Speakers 108 may be located on hearing instruments 102 so that sound generated by speakers 108 is directed medially through respective ear canals of user 104. For instance, speakers 108 may be located at medial tips of hearing instruments 102. The medial tips of hearing instruments 102 are designed to be the most medial parts of hearing instruments 102. Microphones 110 may be located on hearing instruments 102 so that microphones 110 may detect sound within the ear canals of user 104.

Furthermore, hearing instrument 102A may include sensors 118A. Similarly, hearing instrument 102B may include sensors 118B. This disclosure may refer to sensors 118A and sensors 118B collectively as sensors 118. For each of hearing instruments 102, one or more of sensors 118 may be included in in-ear assemblies of hearing instruments 102. In some examples, one or more of sensors 118 are included in behind-the-ear assemblies of hearing instruments 102 or in cables connecting in-ear assemblies and behind-the-ear assemblies of hearing instruments 102. Although not illustrated in the example of FIG. 1, in some examples, one or more devices other than hearing instruments 102 may include one or more of sensors 118. For instance, a mobile phone of computing system 106 may include one or more of sensors 118.

In some examples, an in-ear assembly of hearing instrument 102A includes all components of hearing instrument 102A. Similarly, in some examples, an in-ear assembly includes all components of hearing instrument 102B. In other examples, components of hearing instrument 102A may be distributed between an in-ear assembly and another assembly of hearing instrument 102A. For instance, in examples where hearing instrument 102A is a RIC device, an in-ear assembly may include speaker 108A and microphone 110A and an in-ear assembly may be connected to a behind-the-ear assembly of hearing instrument 102A via a cable. Similarly, in some examples, components of hearing instrument 102B may be distributed between in-ear assembly and another assembly of hearing instrument 102B. In examples where hearing instrument 102A is an ITE, ITC, CIC, or IIC device, the in-ear assembly may include all primary components of hearing instrument 102A. In examples where hearing instrument 102B is an ITE, ITC, CIC, or IIC device, the in-ear assembly may include all primary components of hearing instrument 102B.

Hearing instruments 102 may have a wide variety of configurable output settings. For example, the output settings of hearing instruments 102 may include audiological output settings that address hearing loss. Such audiological output settings may include gain levels for individual frequency bands, settings to control frequency compression, settings to control frequency translation, and so on. Other output settings of hearing instruments 102 may apply various noise reduction filters to incoming sound signals, apply directional processing modes, and so on.

Hearing instruments 102 may use different output settings in different situations. For example, hearing instruments 102 may use a first set of output settings for situations in which hearing instruments 102 are in a crowded restaurant and another set of output settings for situations in which hearing instruments 102 are in a quiet location, and so on. Hearing instruments 102 may be configured to automatically change between sets of output settings. There are challenges associated with automatically changing between sets of output settings. For example, hearing instruments 102 may be too sensitive or insufficiently sensitive to changes in the environment or activity of user 104 to change the output settings of hearing instruments 102. This may reduce the satisfaction of user 104 with hearing instruments 102.

This disclosure describes techniques that may address this and other problems. As described herein, processing system 114 may determine, based on signals from one or more sensors 118 of hearing instruments 102, current values of a plurality of context parameters. Processing system 114 may determine, based on the current values of the plurality of context parameters, that a current context of hearing instruments 102 has changed from a first context of a plurality of contexts to a second context of the plurality of contexts. Each context in the plurality of contexts may correspond to a different unique combination of potential values of the plurality of context parameters.

In some examples, the plurality of context parameters may include one or more context parameters that are not determined based on signals from sensors 118. For example, the plurality of context parameters may include one or more context parameters having values that may be set based on user input. For instance, the plurality of context parameters may include user age, gender, lifestyle (e.g., sedentary or active). and so on.

Furthermore, processing system 114 may update statistics of the contexts. For each context of the plurality of contexts, the statistics of the context include time-based statistics for the context. The time-based statistics for the context are statistics with respect to time hearing instruments 102 spent in the context. For example, the statistics of the context with respect to the time hearing instruments 102 spent in the context may include a mean of time spent in the context, a variance of time spent in the context, a maximum time spend in the context, a minimum time spent in the context, and so on.

In some examples, in response to a determination that the current context of hearing instruments 102 has changed from a first context to a second context, processing system 114 may determine, based on the statistics of at least one of the first or second contexts whether to change current output settings of hearing instruments 102 to output settings associated with the second context. For example, processing system 114 may make a determination to change the current output settings of hearing instruments 102 to the output settings associated with the second context after at least an amount of time equal to the mean spent in the first context minus to 1.5 times the variation of time spent in the first context has elapsed following a time that processing system 114 changed the current output settings to the output settings associated with the first context. In another example, processing system 114 may make a determination to change the current output settings of hearing instruments 102 to the output settings associated with the second context when at least a minimum time spent in the second in the second context has elapsed following the change to the second context.

Because processing system 114 determines whether to change the current output settings of hearing instruments 102 based on statistics of contexts, the process of switching output settings may be more accurate and may lead to a better experience for user 104. For instance, determining whether to change the current output settings of hearing instruments 102 based on the statistics of contexts, processing system 114 may avoid situations in which processing system 114 changes the current output settings of hearing instruments 102 too quickly or does not change the current output settings of hearing instruments 102 in a responsive enough manner. At the same time, using contexts that are defined based on multiple context parameters may allow hearing instruments 102 to use a wider variety of output settings.

Figure 2:
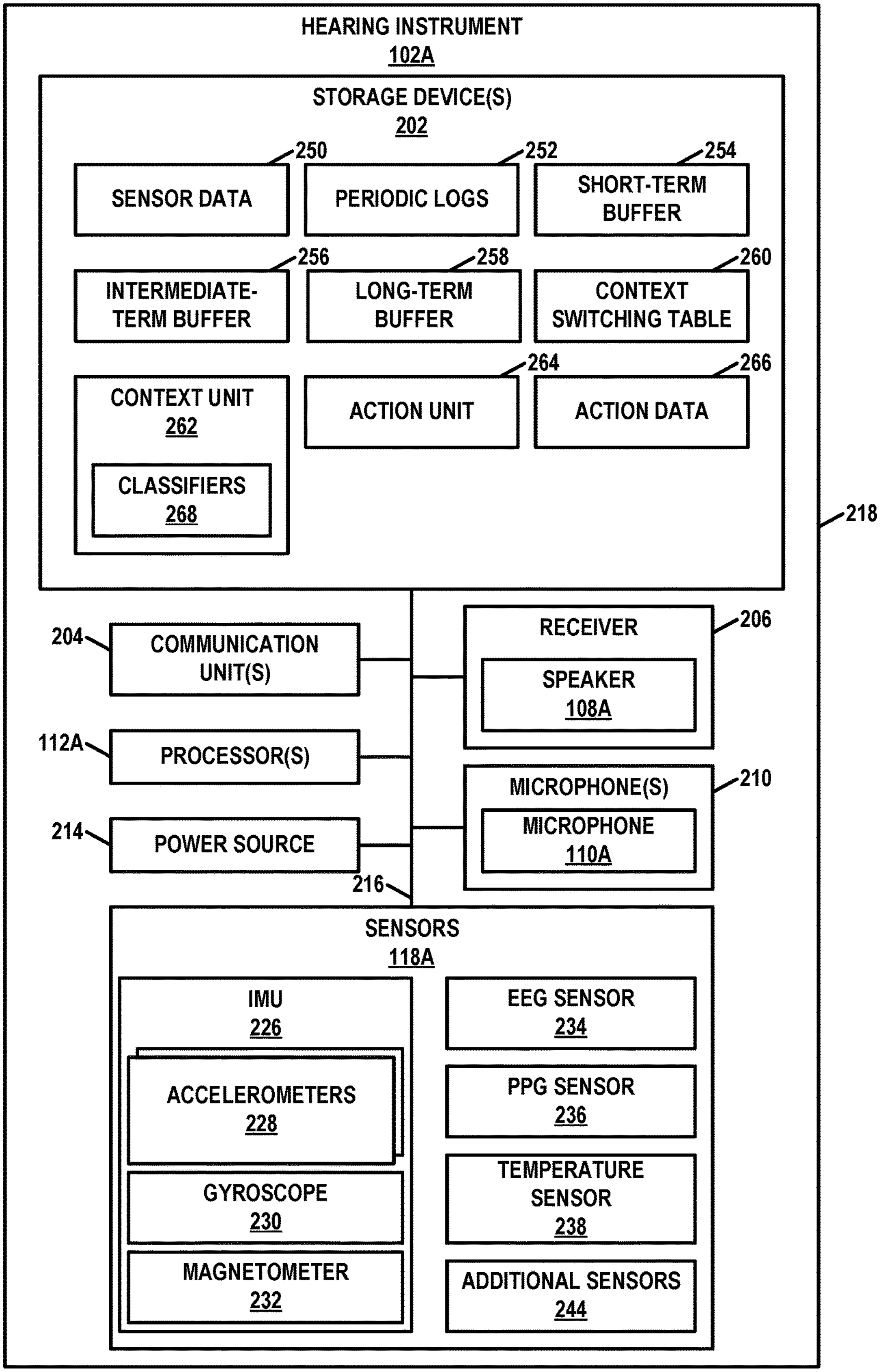
FIG. 2 is a block diagram illustrating example components of a hearing instrument, in accordance with one or more aspects of this disclosure.

FIG. 2 is a block diagram illustrating example components of hearing instrument 102A, in accordance with one or more aspects of this disclosure. Hearing instrument 102B may include the same or similar components of hearing instrument 102A shown in the example of FIG. 2. In the example of FIG. 2, hearing instrument 102A comprises one or more storage devices 202, one or more communication units 204, a receiver 206, one or more processors 112A, one or more microphones 210, sensors 118A, a power source 214, and one or more communication channels 216. Communication channels 216 provide communication between storage devices 202, communication unit(s) 204, receiver 206, processor(s) 112A, microphone(s) 210, and sensors 118A. Storage devices 202, communication unit(s) 204, receiver 206, processors 112A, microphone(s) 210, and sensors 118A may draw electrical power from power source 214.

In the example of FIG. 2, each of storage devices 202, communication unit(s) 204, receiver 206, processors 112A, microphone(s) 210, sensors 118A, power source 214, and communication channels 216 are contained within a single housing 218. Thus, in such examples, each of storage devices 202, communication unit(s) 204, receiver 206, processors 112A, microphone(s) 210, sensors 118A, power source 214, and communication channels 216 may be within an in-ear assembly of hearing instrument 102A. However, in other examples of this disclosure, storage devices 202, communication unit(s) 204, receiver 206, processors 112A, microphone(s) 210, sensors 118A, power source 214, and communication channels 216 may be distributed among two or more housings. For instance, in an example where hearing instrument 102A is a RIC device, receiver 206, one or more of microphone(s) 210, and one or more of sensors 118A may be included in an in-ear housing separate from a behind-the-ear housing that contains the remaining components of hearing instrument 102A. In such examples, a RIC cable may connect the two housings.

In the example of FIG. 2, sensors 118A include an inertial measurement unit (IMU) 226 that is configured to generate data regarding the motion of hearing instrument 102A. IMU 226 may include a set of sensors. For instance, in the example of FIG. 2, IMU 226 includes one or more accelerometers 228, a gyroscope 230, a magnetometer 232, combinations thereof, and/or other sensors for determining the motion of hearing instrument 102A. Furthermore, in the example of FIG. 2, sensors 118A may include an electroencephalography (EEG) sensor 234, a photoplethysmography (PPG) sensor 236, and a temperature sensor 238. In some examples, sensors 118A may include additional sensors 244. Additional sensors 244 may include capacitance sensors, blood oximetry sensors, blood pressure sensors, environmental pressure sensors, environmental humidity sensors, skin galvanic response sensors, light sensors, magnetic sensors, vibration sensors, optical sensors, and/or other types of sensors. In some examples, additional sensors 244 may include ocular sensors that capture eye information, such as eye movement, pupil state, eye muscle activity, eyelid movements or positions, and so on. The ocular sensors may include one or more cameras pointed at the eyes of user 104, electrodes, mechanical sensors, sound sensors, and so on. One or more of sensors 118A may capture physiological information, such as heart rate, blood oxygen saturation (SPO2), respiratory rate, and other information understand the physical state of user 104.

Storage device(s) 202 may store data. Storage device(s) 202 may comprise volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 202 may further be configured for long-term storage of information as non-volatile memory space and retain information after power on/off cycles. Examples of non-volatile memory configurations may include flash memories, or forms of electrically programmable memories (EPROM) or electrically erasable and programmable (EEPROM) memories.

Communication unit(s) 204 may enable hearing instrument 102A to send data to and receive data from one or more other devices, such as a device of computing system 106 (FIG. 1), another hearing instrument (e.g., hearing instrument 102B), an accessory device, a mobile device, or another type of device. Communication unit(s) 204 may enable hearing instrument 102A to use wireless or non-wireless communication technologies. For instance, communication unit(s) 204 enable hearing instrument 102A to communicate using one or more of various types of wireless technology, such as a BLUETOOTH™ technology, 3G, 4G, 4G LTE, 5G, 6G, ZigBee, WI-FI™, Near-Field Magnetic Induction (NFMI), ultrasonic communication, infrared (IR) communication, or another wireless communication technology. In some examples, communication unit(s) 204 may enable hearing instrument 102A to communicate using a cable-based technology, such as a Universal Serial Bus (USB) technology.

Receiver 206 comprises one or more speakers, such as speaker 108A, for generating audible sound. Microphone(s) 210 detect incoming sound and generate one or more electrical signals (e.g., an analog or digital electrical signal) representing the incoming sound.

Processor(s) 112A may be processing circuits configured to perform various activities. For example, processor(s) 112A may process signals generated by microphone(s) 210 to enhance, amplify, or cancel-out particular channels within the incoming sound. Processor(s) 112A may then cause receiver 206 to generate sound based on the processed signals. In some examples, processor(s) 112A include one or more digital signal processors (DSPs). In some examples, processor(s) 112A may cause communication unit(s) 204 to transmit one or more of various types of data. For example, processor(s) 112A may cause communication unit(s) 204 to transmit data to computing system 106. Furthermore, communication unit(s) 204 may receive audio data from computing system 106 and processor(s) 112A may cause receiver 206 to output sound based on the audio data.

In the example of FIG. 2, receiver 206 includes speaker 108A. Speaker 108A may generate a sound that includes a range of frequencies. Speaker 108A may be a single speaker or one of a plurality of speakers in receiver 206. For instance, receiver 206 may also include "woofers" or "tweeters" that provide additional frequency range. In some examples, speaker 108A may be implemented as a plurality of speakers. In some examples, hearing instrument 102A may include mechanical/automated venting controls that regulate the amount of sound leakage or ambient noise passing through the hearing device. Vent status may be an additional hearing instrument setting that may be controlled based on a context of hearing instrument 102A.

Furthermore, in the example of FIG. 2, microphone(s) 210 include microphone 110A. Microphone 110A may measure an acoustic response to the sound generated by speaker 108A. In some examples, microphone(s) 210 include multiple microphones. Thus, microphone 110A may be a first microphone and microphone(s) 210 may also include a second, third, etc. microphone. In some examples, microphone(s) 210 include microphones configured to measure sound in an auditory environment of user 104. In some examples, one or more of microphone(s) 210 in addition to microphone 110A may measure the acoustic response to the sound generated by speaker 108A.

In the example of FIG. 2, storage device(s) 202 may include sensor data 250, periodic logs 252, a short-term buffer 254, an intermediate-term buffer 256, a long-term buffer 258, and a context switching table 260. Storage device(s) 202 may further include a context unit 262 and an action unit 264. Context unit 262 and action unit 264 may include computer-executable instructions that processors 114A may execute. In general terms, context unit 262 may perform activities to determine a current context of hearing instrument 102A and maintain statistics regarding the contexts of hearing instrument 102A. Action unit 264 may select output settings of one or more of hearing instruments 102. In the example of FIG. 2, context unit 262 includes one or more classifiers 268 that may use sensor data 250 to classify activities or environments.

Processor(s) 112A may be configured to store samples from sensors 118A and microphones 210 in sensor data 250. For example, sensor of sensors 118A may generate samples at individual sampling rates. For instance, EEG sensor 234 may generate EEG samples every 15 ms, PPG sensor 236 may generate a blood perfusion sample once every temperature sensor 238 may generate a temperature sample once every 1 second, and so on. In some examples, sensor data 250 may store series of samples generated by sensors 118. For instance, sensor data 250 may store acoustic samples generated by microphones 210 representing the last two minutes of audio in an acoustic environment of hearing instrument 102A.

Context unit 262 may use sensor data 250 to determine values of a plurality of context parameters. For example, classifiers 268 of context unit 262 may use sensor data 250 to determine current values of a plurality of context parameters. For example, classifiers 268 may include a classifier that uses data from EEG sensor 234 to determine a value of a brain engagement parameter that indicates an engagement status of the brain of user 104 in conversation. In some examples, classifiers 268 include an activity classifier that uses data from PPG sensor 236 and/or IMU 226 to determine a value of an activity parameter that indicates an activity (e.g., running, cycling, standing, sitting, etc.) of user 104. In some examples, the activity classifier may generate 1-byte chunks of data to indicate the activity. Furthermore, in some examples, classifiers 268 may include an own-voice classifier that uses data from microphones 210 to determine a value of an own-voice parameter indicating whether user 104 is speaking. In some examples, classifiers 268 may include an acoustic environment classifier that classifies an acoustic environment of hearing instrument 102A. An emotion classifier may determine a current emotional state of user 104 based on data from one or more of sensors 118A. In some examples, one or more of classifiers 268 use data from multiple sensors to determine values of context parameters.

Classifiers 268 may operate at different frame rates. For example, an acoustic environment classifier may operate at a frame rate of 10 milliseconds, 100 milliseconds. 128 milliseconds, or other time interval. An activity classifier may operate at a frame rate of 2.5 seconds, 30 seconds or other time interval.

Each context may correspond to a different combination of values of the context parameters. For example, the context parameters may include an acoustic environment parameter, an activity parameter, an own-voice parameter, an emotion parameter, and an EEG parameter. In this example, a first context may correspond to a situation in which the value of the acoustic environment parameter indicates that user 104 is in a loud restaurant, the value of the activity parameter indicates that user 104 is sitting, the value of the own-voice parameter indicates that user 104 is talking, a value of the emotion parameter indicates user 104 is happy, and the value of the EEG parameter indicates that user 104 is mentally engaged. A second context may correspond to a situation in which the value of the acoustic environment parameter indicates that user 104 is in a loud restaurant, the value of the activity parameter indicates that user 104 is sitting, the value of the own-voice parameter indicates that user 104 is not talking, a value of the emotion parameter indicates user 104 is happy, and the value of the EEG parameter indicates that user 104 is mentally engaged. A third context may correspond to a situation in which the value of the acoustic environment parameter indicates that user 104 is in a loud restaurant, the value of the activity parameter indicates that user 104 is sitting, the value of the own-voice parameter indicates that user 104 is talking, a value of the emotion parameter indicates user 104 is tired, and the value of the EEG parameter indicates that user 104 is mentally engaged.

Other example context parameters may include a task parameter, a location parameter, a venue parameter, a venue condition parameter, an acoustic target parameter, an acoustic background parameter, an acoustic event parameter, an acoustic condition parameter, a time parameter, and so on. The task parameter may indicate a task that user 104 is performing. Example values of the task parameter may include talking, listening, handling hearing instrument, typing on keyboard, reading, watching television, and so on. The location parameter may indicate a location or area of user 104, which may be determined using a satellite navigation system. The venue parameter may indicate a type of location, such as restaurant, home, car, outdoors, theatre, work, kitchen, and so on. The venue conditions parameter may indicate conditions in the user's current venue. Example values of the venue conditions parameter may include hot, cold, freezing, comfortable temperature, humid, bright light, dark, and so on. The acoustic target parameter may indicate an acoustic target for user 104. In other words, the acoustic target parameter may indicate what type of sounds user 104 is trying to listen to. Example values of the acoustic target parameter may include speech, music, and so on. The acoustic background parameter may indicate a current type of acoustic background noise. Example values of the acoustic background parameter may include machine noise, babble, wind noise, other noise, and so on. The acoustic event parameter may indicate the occurrence of various acoustic events. Example values of the acoustic event parameter may include coughing, laughter, applause, keyboard tapping, feedback/chirping, and so on. The acoustic condition parameter may indicate a characteristic of the sound in the current environment. Example values of the acoustic condition parameter may include a noise volume level, a reverberation level, and so on. The time parameter may indicate a current time.

Context unit 262 may update periodic logs 252, and thereby determine a current context of hearing instruments 102, on a periodic basis. For example, context unit 262 may update periodic logs 252 every 15 seconds, 30 seconds, 60 seconds, etc. Thus, the updates to periodic logs 252 may be less frequent than updates to sensor data 250.

Context unit 262 may use periodic logs 252 to maintain short-term buffer 254. Short-term buffer 254 may comprise a series of entries corresponding to a series of time intervals each having a same duration. For example, each of the entries in short-term buffer 254 may correspond to a different 15-minute time interval. For each entry of the series of entries in short-term buffer 254, the entry may include a timestamp that identifies the time interval corresponding to the entry. For each context of the plurality of contexts, the entry may include a time-in-context value indicating an amount of time hearing instrument 102A spent in the context during the time interval corresponding to the entry. For example, an entry corresponding to specific 15-minute time interval may indicate that hearing instrument 102A spent 5 minutes in a first context, 2 minutes in a second context, 8 minutes in a third context, and no minutes in any other context.

Context unit 262 may attempt to offload entries in short-term buffer 254 to computing system 106. In other words, context unit 262 may communicate entries in short-term buffer 254 to computing system 106. For instance, context unit 262 may attempt to offload data in short-term buffer 254 to computing system 106 when consolidation condition is reached (e.g., the number of entries in short-term buffer 254 exceeds a threshold number of entries or after a time interval expires). If context unit 262 is able to offload entries in short-term buffer 254, context unit 262 may delete or subsequently overwrite the offloaded entries. Offloading an entry to computing system 106 may involve use of communication unit(s) 204 to transmit the entry to computing system 106. Computing system 106 may have greater storage capabilities than hearing instruments 102. Accordingly, computing system 106 may be able to store more entries than hearing instrument 102A. Storing more entries corresponding to shorter time intervals may be more useful for various purposes than entries corresponding to longer time intervals.

Nevertheless, context unit 262 may be unable to offload entries in short-term buffer 254 prior to short-term buffer 254 becoming full. For example, computing system 106 may include a mobile phone of user 104 and a server system. In this example, context unit 262 may attempt to communication unit(s) 204 to offload entries in short-term buffer 254 to the server system via the mobile phone. However, communication unit(s) 204 may be unable to communicate with the mobile phone, e.g., if the mobile phone is powered off, the mobile phone is out of range, and so on.

Accordingly, when the number of entries in short-term buffer 254 exceeds a consolidation threshold, context unit 262 may consolidate two or more entries in short-term buffer 254 into a single entry in intermediate-term buffer 256. Intermediate-term buffer 256 may comprise a series of entries corresponding to a series of time intervals each having a same duration that is greater than the duration of the time intervals corresponding to entries in short-term buffer 254. For example, each of the entries in short-term buffer 254 may correspond to a different 15-minute time interval and each of the entries in intermediate-term buffer 256 may correspond to a different 60-minute time interval. For each entry of the series of entries in intermediate-term buffer 256, the entry may include a timestamp that identifies the time interval corresponding to the entry. For each context of the plurality of contexts, the entry may include a time-in-context value indicating an amount of time the one or more hearing instruments spent in the context during the time interval corresponding to the entry. For example, an entry corresponding to specific 60-minute time interval may indicate that hearing instruments 102 spent 30 minutes in a first context, 5 minutes in a second context, 25 minutes in a third context, and no minutes in any other context. Consolidating two or more entries in short-term buffer 254 into an entry in intermediate-term buffer 256 may involve totaling the times spent in each of the contexts in each of the entries in short-term buffer 254 being consolidated to determine the time spent in each of the contexts during the time interval corresponding to the entry in intermediate-term buffer 256.

Context unit 262 may attempt to offload entries in intermediate-term buffer 256 to computing system 106. For instance, context unit 262 may attempt to offload data in intermediate-term buffer 256 to computing system 106 when the number of entries in intermediate-term buffer 256 exceeds a threshold number of entries. If context unit 262 is able to offload entries in intermediate-term buffer 256, context unit 262 may delete or subsequently overwrite the offloaded entries.

In addition to maintaining short-term buffer 254 and intermediate-term buffer 256, context unit 262 may also maintain long-term buffer 258. Long-term buffer 258 may include an entry for each context. The entry for a context may include statistics for the context, such as time-based statistics for the context. However, the entries in long-term buffer 258 do not include timestamps. Because the number of entries in long-term buffer 258 does not increase, long-term buffer 258 does not overflow if context unit 262 is unable to communicate with computing system 106. Context unit 262 may transmit entries in long-term buffer 258 when communication between hearing instrument 102A and computing system 106 is possible. However, entries in long-term buffer 258 do not provide as much information as entries in short-term buffer 254 and entries in intermediate-term buffer 256. Accordingly, computing system 106 may have less ability to learn specific time-based trends for user 104, such as user 104 tending to be in a specific context during specific times of day or on specific days of the week.

In the example of FIG. 2, context unit 262 may maintain context switching table 260. Context switching table 260 may include entries that indicate the number of times that hearing instrument 102A has switched between two contexts. For example, context switching table 260 may include an entry indicating the number of times hearing instrument 102A has switched from context A to context B, an entry indicating the number of times hearing instrument 102A has switched from context B to context A, an entry indicating the number of times hearing instrument 102A has switched from context B to context C, and so on.

Context unit 262 may offload data in context switching table 260 to computing system 106. In some examples, context unit 262 offloads data in context switching table 260 on a periodic basis, an event-driven basis, or another type of basis. In some examples, context switching table 260 may be structured as a set of set of entries, where each entry indicates two contexts and a counter indicates a number of changes from one of the contexts to the other. In such examples, the set of entries does not need to include an entry for a pair of contexts unless at least one change from one of the contexts to the other context has occurred.

Action unit 264 may determine actions to perform. For example, action unit 265 may adjust the output settings of hearing instrument 102A. The output settings of hearing instrument 102A may include a gain level, a level of noise reduction, directionality, and so on. In some examples, action unit 264 may determine whether to change the current output settings of hearing instrument 102A in response to context unit 262 determining that the current context of hearing instrument 102A has changed. Thus, action unit 264 may or may not change the output settings of hearing instrument 102A in response to context unit 262 determining that the current context of hearing instrument 102A has changed. Action unit 264 may make the determination not to change the current output settings to output settings associated with the new current context of hearing instrument 102A if, for example, it is likely that the current context of hearing instrument 102A will quickly change back to a previous context.

In some examples, storage devices(s) 202 may store action data 266 that indicates actions associated with contexts. For example, action data 266 include data indicating that a context may be associated with an action of changing output settings of hearing instrument 102A to a specific combination. In another example, action data 266 may include data indicating an action of displaying a particular user interface on a smartwatch or other wearable device. Action unit 264 may use action data 266 to determine actions to perform in response to determining that the current context of hearing instrument 102A has changed.

Example types of actions may include changes to noise and intelligibility settings, gain settings, changes to microphone directionality settings, changes to frequency shaping and directional settings to improve sound localization, switching to telecoil use, suggesting use of accessories such as remote microphones, and so on.

As described elsewhere in this disclosure, a context may be defined as a combination of values of context parameters. In some examples, the combination of values of the context parameters defining a context may be used as an identifier of the context. For instance, a context may be identified using a vector that includes a numerical value for each of the context parameters. A considerable amount of storage space may be involved with storing the values of the context parameters, e.g., in short-term buffer 254, intermediate-term buffer 256, long-term buffer 258, or context switching table 260.

In accordance with one or more techniques of this disclosure, context unit 262 may generate a hash value by applying a hash function to the values of the context parameters defining a context. The hash value may then be used as an identifier of the context. In this way, a vector that includes the numerical values of the context parameters may be mapped to a single value (e.g., a single integer value). The hash value may include substantially fewer bits than the values of the context parameters. The hash values may be used to identify contexts in short-term buffer 254, intermediate-term buffer 256, long-term buffer 258, context switching table 260, and other types of data.

In some examples, it may be valuable to have information regarding the sequence of contexts in which hearing instrument 102A has been. For example, action unit 264 may use the sequence of contexts to predict a next context of hearing instrument 102A. For instance, action unit 264 may determine, for each context of the plurality of contexts, a probability of the context given the sequence of contexts. Action unit 264 may then predict that the next context of hearing instruments 102 is the context with the highest probability. In examples where computing system 106 performs actions based on the sequence of contexts, hearing instrument 102A may need to wirelessly transmit data indicating the sequence of contexts. However, transmitting such data may consume bandwidth and battery power, which may be limited in hearing instrument 102A. Hence, in accordance with one or more techniques of this disclosure, context unit 262 may generate a second hash value by applying a second hash function to a sequence of hash values that identify contexts in the sequence of contexts. Thus, the second hash value may represent the entire sequence of contexts. Because the second hash value contains fewer bits than the hash values that identify the individual contexts in the sequence of contexts, communication unit(s) 204 may transmit the second hash value more efficiently than the hash values that identify the contexts in the sequence of contexts.

The discussion above with respect to FIG. 2 described actions and contexts with respect to only hearing instrument 102A. Components of hearing instrument 102B may concurrently perform similar processes. Thus, in some examples, hearing instruments 102B may separately maintain periodic logs, a short-term buffer, an intermediate-term buffer, a long-term buffer, and a context switching table. A context unit of hearing instrument 102B may determine a context of hearing instrument 102B separately from the context of hearing instrument 102A.

In some examples, one of hearing instruments 102 determines a context and selects actions for both of hearing instruments 102. Hearing instruments 102A may send and/or receive data from sensors 118 and microphones 210 to determine values of context parameters.

Figure 3:
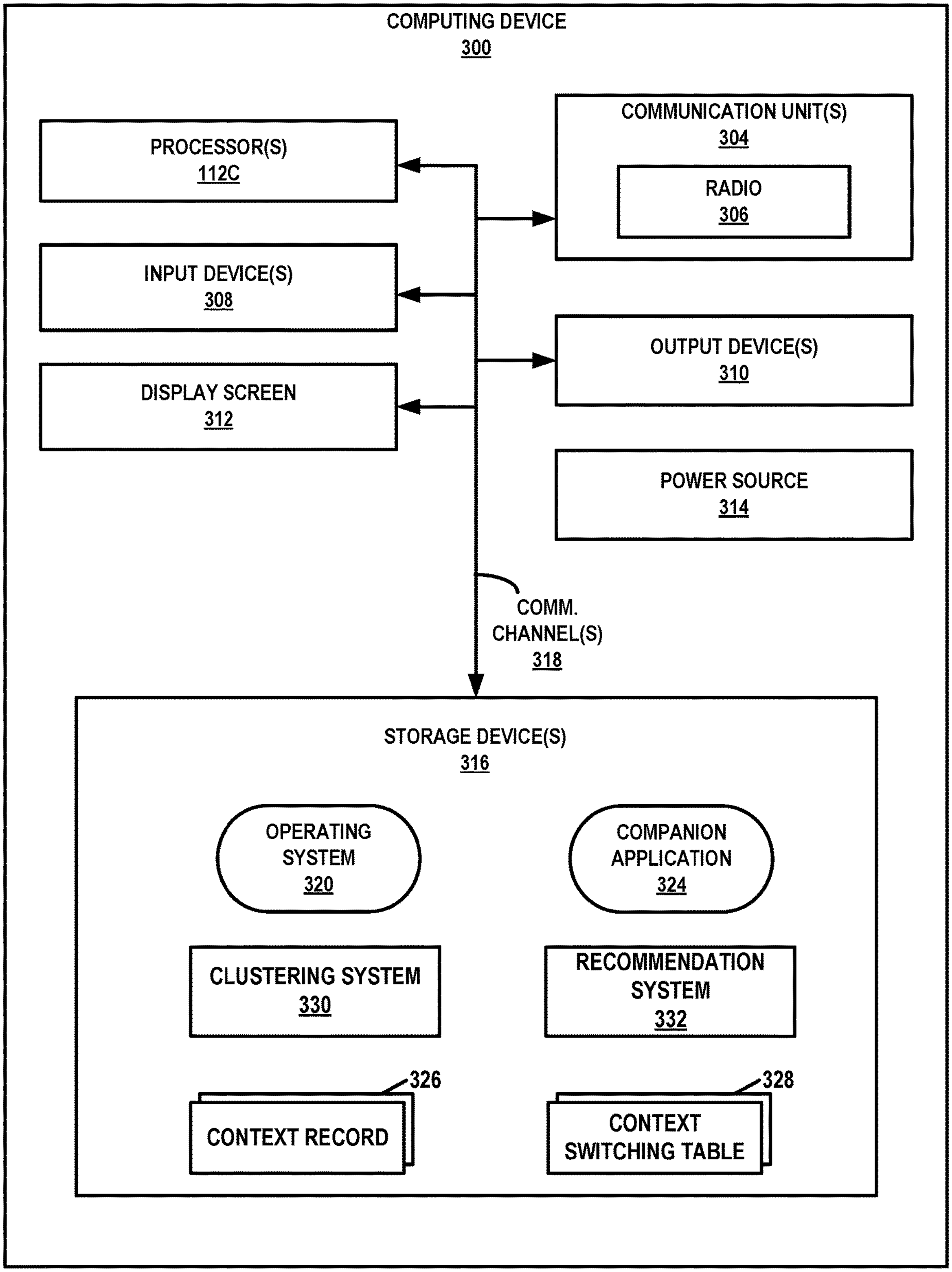
FIG. 3 is a block diagram illustrating example components of a computing device, in accordance with one or more aspects of this disclosure.

FIG. 3 is a block diagram illustrating example components of a computing device 300, in accordance with one or more aspects of this disclosure. FIG. 3 illustrates only one particular example of computing device 300, and many other example configurations of computing device 300 exist. Computing device 300 may be a computing device in computing system 106 (FIG. 1). For instance, computing device 300 may be a cloud-based server device that is remote from hearing instruments 102. In some examples, computing device 300 is a programming device, such as a smartphone, tablet computer, personal computer, accessory device, or other type of device.

As shown in the example of FIG. 3, computing device 300 includes one or more processors 112C, one or more communication units 304, one or more input devices 308, one or more output devices 310, a display screen 312, a power source 314, one or more storage devices 316, and one or more communication channels 318. Computing device 300 may include other components. For example, computing device 300 may include physical buttons, microphones, speakers, communication ports, and so on. Communication channel(s) 318 may interconnect each of processor(s) 112C, communication unit(s) 304, input device(s) 308, output device(s) 310, display screen 312, and storage device(s) 316 for inter-component communications (physically, communicatively, and/or operatively). In some examples, communication channel(s) 318 may include a system bus, a network connection, an inter-process communication data structure, or any other method for communicating data. Power source 314 may provide electrical energy to components processor(s) 112C, communication unit(s) 304, input device(s) 308, output device(s) 310, display screen 312, and storage device(s) 316.

Storage device(s) 316 may store information required for use during operation of computing device 300. In some examples, storage device(s) 316 have the primary purpose of being a short-term and not a long-term computer-readable storage medium. Storage device(s) 316 may be volatile memory and may therefore not retain stored contents if powered off. Storage device(s) 316 may be configured for long-term storage of information as non-volatile memory space and retain information after power on/off cycles. In some examples, processor(s) 112C on computing device 300 read and may execute instructions stored by storage device(s) 316.

Computing device 300 may include one or more input devices 308 that computing device 300 uses to receive user input. Examples of user input include tactile, audio, and video user input. Input device(s) 308 may include presence-sensitive screens, touch-sensitive screens, mice, keyboards, voice responsive systems, microphones or other types of devices for detecting input from a human or machine.

Communication unit(s) 304 may enable computing device 300 to send data to and receive data from one or more other computing devices (e.g., via a communications network, such as a local area network or the Internet). For instance, communication unit(s) 304 may be configured to receive data sent by hearing instrument(s) 102, receive data generated by user 104 of hearing instrument(s) 102, receive and send request data, receive and send messages, and so on. In some examples, communication unit(s) 304 may include wireless transmitters and receivers that enable computing device 300 to communicate wirelessly with the other computing devices. For instance, in the example of FIG. 3, communication unit(s) 304 include a radio 306 that enables computing device 300 to communicate wirelessly with other computing devices, such as hearing instruments 102 (FIG. 1). Examples of communication unit(s) 304 may include network interface cards, Ethernet cards, optical transceivers, radio frequency transceivers, or other types of devices that are able to send and receive information. Other examples of such communication units may include BLUETOOTH™, 3G, 4G, 5G, 6G, and WI-FI™ radios, Universal Serial Bus (USB) interfaces, etc. Computing device 300 may use communication unit(s) 304 to communicate with one or more hearing instruments (e.g., hearing instruments 102 (FIG. 1, FIG. 2)). Additionally, computing device 300 may use communication unit(s) 304 to communicate with one or more other remote devices.

Output device(s) 310 may generate output. Examples of output include tactile, audio, and video output. Output device(s) 310 may include presence-sensitive screens, sound cards, video graphics adapter cards, speakers, liquid crystal displays (LCD), or other types of devices for generating output. Output device(s) 310 may include display screen 312.

Processor(s) 112C may read instructions from storage device(s) 316 and may execute instructions stored by storage device(s) 316. Execution of the instructions by processor(s) 112C may configure or cause computing device 300 to provide at least some of the functionality ascribed in this disclosure to computing device 300. As shown in the example of FIG. 3, storage device(s) 316 include computer-readable instructions associated with operating system 320 and a companion application 324. Execution of instructions associated with operating system 320 may cause computing device 300 to perform various functions to manage hardware resources of computing device 300 and to provide various common services for other computer programs.

Execution of instructions associated with companion application 324 may cause computing device 300 to configure communication unit(s) 304 to send and receive data from hearing instruments 102, such as data to adjust the settings of hearing instruments 102. In some examples, companion application 324 is an instance of a web application or server application. In some examples, such as examples where computing device 300 is a mobile device or other type of computing device, companion application 324 may be a native application.

Furthermore, in the example of FIG. 3, storage device(s) 316 may store one or more context records 326. In examples where computing device 300 is a smartphone or other device specific to a user (e.g., user 104), storage device(s) 316 may store only a context record of the user. In examples where computing device 300 is part of a server system, storage device(s) 316 may store context records for a population of users.

A context record for a user may include data regarding contexts that the hearing instruments of the user have been in. For instance, a context record of a user may include data indicating times in which the hearing instruments of the user were in specific contexts. In some examples, the context record of the user may include statistics of the contexts for the user. In some examples, the context record of the user includes the types of data stored in short-term buffer 254, intermediate-term buffer 256, and/or long-term buffer 258.

Furthermore, storage device(s) 316 may store one or more context switching tables 328 of one or more users. For instance, in an example where computing device 300 is part of a server system, storage device(s) 316 may store context switching tables for a population of users.

Figure 4:
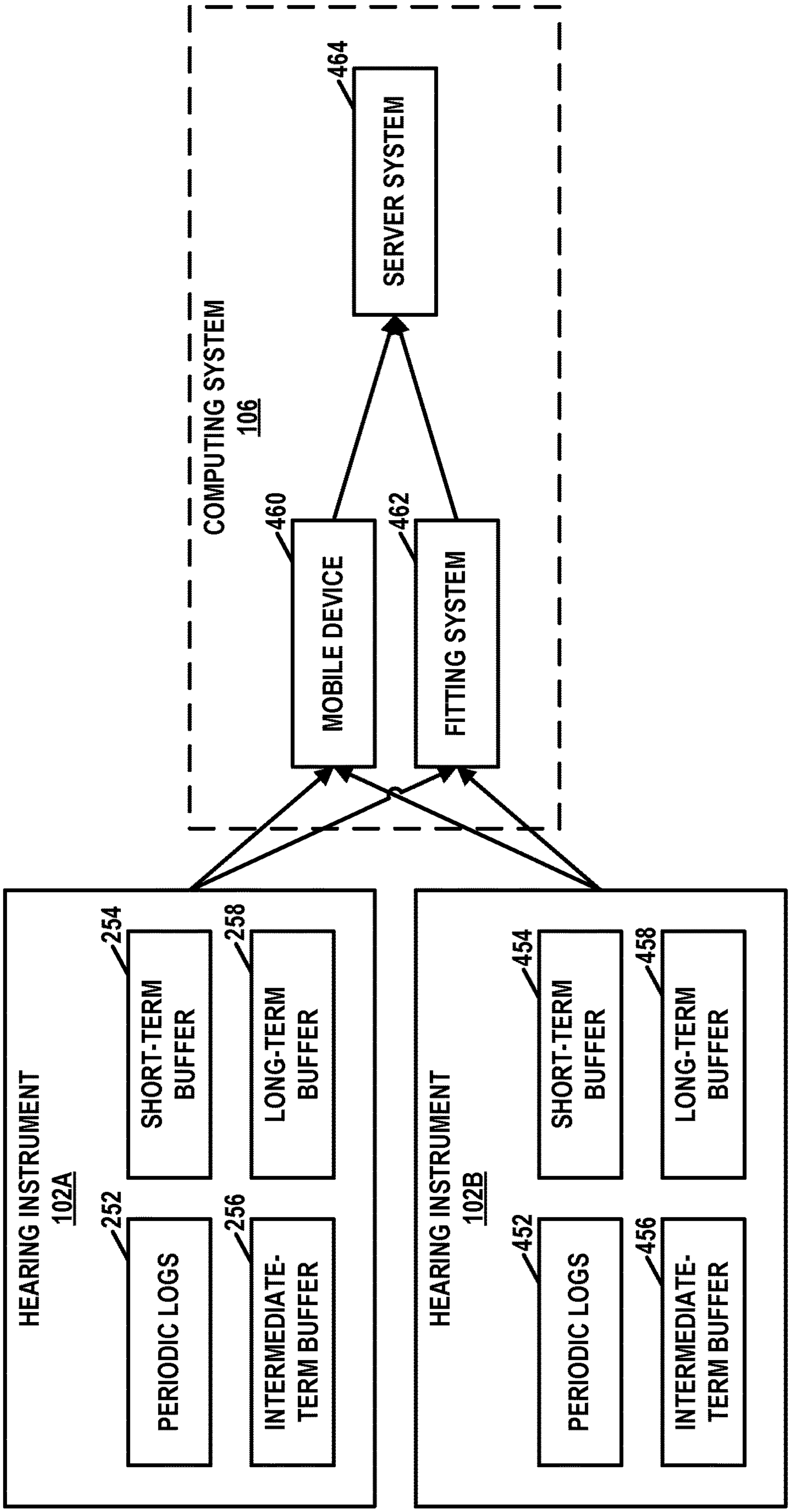
FIG. 4 is a block diagram illustrating an example data flow, in accordance with one or more aspects of this disclosure.

In the example of FIG. 4, storage device(s) 316 include computer-executable instructions associated with a clustering system 330 and a recommendation system 332. Clustering system 330 may identify clusters of users. Recommendation system 332 may generate recommendations. A cluster of users may be a group of two or more users sharing one or more characteristics. In some examples, clustering system 330 identifies clusters of users based on data regarding the contexts of hearing instruments of the users. For example, clustering system 330 may identify clusters of users based on context records 326 and/or context switching tables 328.

Clustering system 330 may cluster users in one or more ways. For example, clustering system 330 may cluster users based on amounts of time the users spend in various contexts. For example, clustering system 330 may use context records 326 to identify a cluster of people who spend more than one hour each day in a first context, a cluster of people who spend more than one hour each day in a second context, and so on. Furthermore, in this example, recommendation system 332 may determine that a user is in particular cluster and may determine, based on context switching tables 328 that the hearing instruments of users in the particular cluster are most likely to transition to a specific next from the current context of the hearing instruments of the user. Accordingly, recommendation system 332 may cause a device (e.g., a smartwatch of the user) to prompt the user to indicate whether the user would like to change output settings of the hearing instruments of the user to a configuration associated with the predicted next context. In some examples, recommendation system 332 may send a command to the hearing instruments of the user to change the output settings of the hearing instruments of the user.

In another example where clustering system 330 clusters users based on amounts of time spent in various contexts and recommendation system 332 determines that a user is in a particular cluster, recommendation system 332 may determine, based on an average amount of time the users in the cluster spend in a particular context, whether the context of the hearing instruments of the user is likely to change within a given upcoming time interval (e.g., within the next minute, 10 minutes, etc.). Recommendation system 332 may perform one or more actions based on the determination the context of the hearing instruments of the user is likely to change within the given upcoming time interval.

In some examples, clustering system 330 may use context switching tables 328 to cluster users around typical context transitions. For instance, there are some users who ride bicycles more than other users. For such users, there may be more context switches related to bicycling (such as changes in wind noise, traffic noise, etc.) than users who spend more time at home.

Clustering system 330 may determine that a specific user is in a specific cluster. Furthermore, clustering system 330 may determine (e.g., based on numbers of times users in the cluster had to manually change output settings of their hearing instruments) that users in the specific cluster have been particularly satisfied with a specific model of hearing instrument. Recommendation system 332 may determine that a user is part of the specific cluster. Accordingly, recommendation system 332 may recommend the specific model of hearing instrument for the user.

In some examples, recommendation system 332 may determine, based on a context record of a user, that the user frequently spends time in a context associated with noisy restaurants without use an external microphone accessory. Based on this information, recommendation system 332 may recommend that the user acquire an external microphone accessory. In another example, recommendation system 332 may determine, based on context records, that user 104 typically goes to a restaurant or dining area at a particular day of the week or time of day. In this example, recommendation system 332 may perform an action to remind user 104 prior to the user leaving for the restaurant or dining area to bring their external microphone accessory along.

Thus, in some examples, processors 112C may obtain context statistics data for a plurality of sets of hearing instruments. Each set of hearing instruments may comprise one or more hearing instruments associated with a different user in a population of users. For each set of hearing instruments in the plurality of sets of hearing instruments, the context statistics data for the set of hearing instruments may include statistics with respect to time the set of hearing instruments spent in each of the contexts of the plurality of contexts. Processors 112C may identify, based on the context statistics data for the plurality of sets of hearing instruments, a plurality of clusters of sets of hearing instruments that are similar with respect to time spent in each of the contexts of the plurality of contexts. Processors 112C may determine, by the processing circuits, a cluster in the plurality of clusters to which hearing instruments 102 belong. Processors 112 may then initiate one or more actions based on the cluster to which hearing instruments 102 belong. For instance, processors 112 may determine whether to change the current output settings of hearing instruments 102 from output settings associated with a first context to output settings associated with a second context based on the cluster to which hearing instruments 102 belong.

FIG. 4 is a block diagram illustrating an example data flow, in accordance with one or more aspects of this disclosure. In the example of FIG. 4, hearing instrument 102A includes periodic logs 252, short-term buffer 254, intermediate-term buffer 256, and long-term buffer 258. Similarly, hearing instrument 102B includes periodic logs 452, short-term buffer 454, intermediate-term buffer 456, and long-term buffer 458. Periodic logs 452, short-term buffer 454, intermediate-term buffer 456, and long-term buffer 458 may serve the same function as described above with respect to periodic logs 252, short-term buffer 254, intermediate-term buffer 256, and long-term buffer 258.

In the example of FIG. 4, computing system 106 includes a mobile device 460, a fitting system 462, and a server system 464. Mobile device 460 may be a smartphone, tablet, accessory device, or other type of device of user 104. Fitting system 462 may comprise one or more computing devices configured to perform a fitting process that configures hearing instruments 102. For instance, a hearing professional may use fitting system 462 during an initial fitting session of hearing instruments 102 or during later follow-up appointments. Server system 464 may include one or more computing devices, such as server devices.

Hearing instruments 102 may offload the data of periodic logs 252, 452, short-term buffers 254, 454, intermediate-term buffers 256, 456, and long-term buffers 258, 458 to at least one of mobile device 460 or fitting system 462. Mobile device 460 and fitting system 462 may send this data to server system 464. Server system 464 may process the data in accordance with examples provided elsewhere in this disclosure. For instance, server system 464 may use the data to predict next contexts of hearing instruments 102, identify clusters of users, and so on. In some examples, server system 464 may identify actions to perform based on the data. Server system 464 may send instructions to hearing instruments 102 via mobile device 460 and/or fitting system 462 to perform the actions. In some examples, server system 464 may send instructions to mobile device 460 and/or fitting system 462 to perform the actions. In some examples, server system 464 may send messages through other channels, such as email or text messages.

FIG. 5 is a conceptual diagram illustrating an example table 500 for storing statistics regarding time spent in contexts, in accordance with one or more aspects of this disclosure. Table 500 includes context columns 502 and statistics columns 504. Each of context columns 502 corresponds to a different context parameter. Each of statistics columns 504 corresponds to a different statistic. Rows 506 of table 500 correspond to different contexts. Thus, each of rows 506 has a different combination of values in context columns 502. The data in statistics columns 504 of a row indicate statistics regarding the context corresponding to the row.

Figure 6:
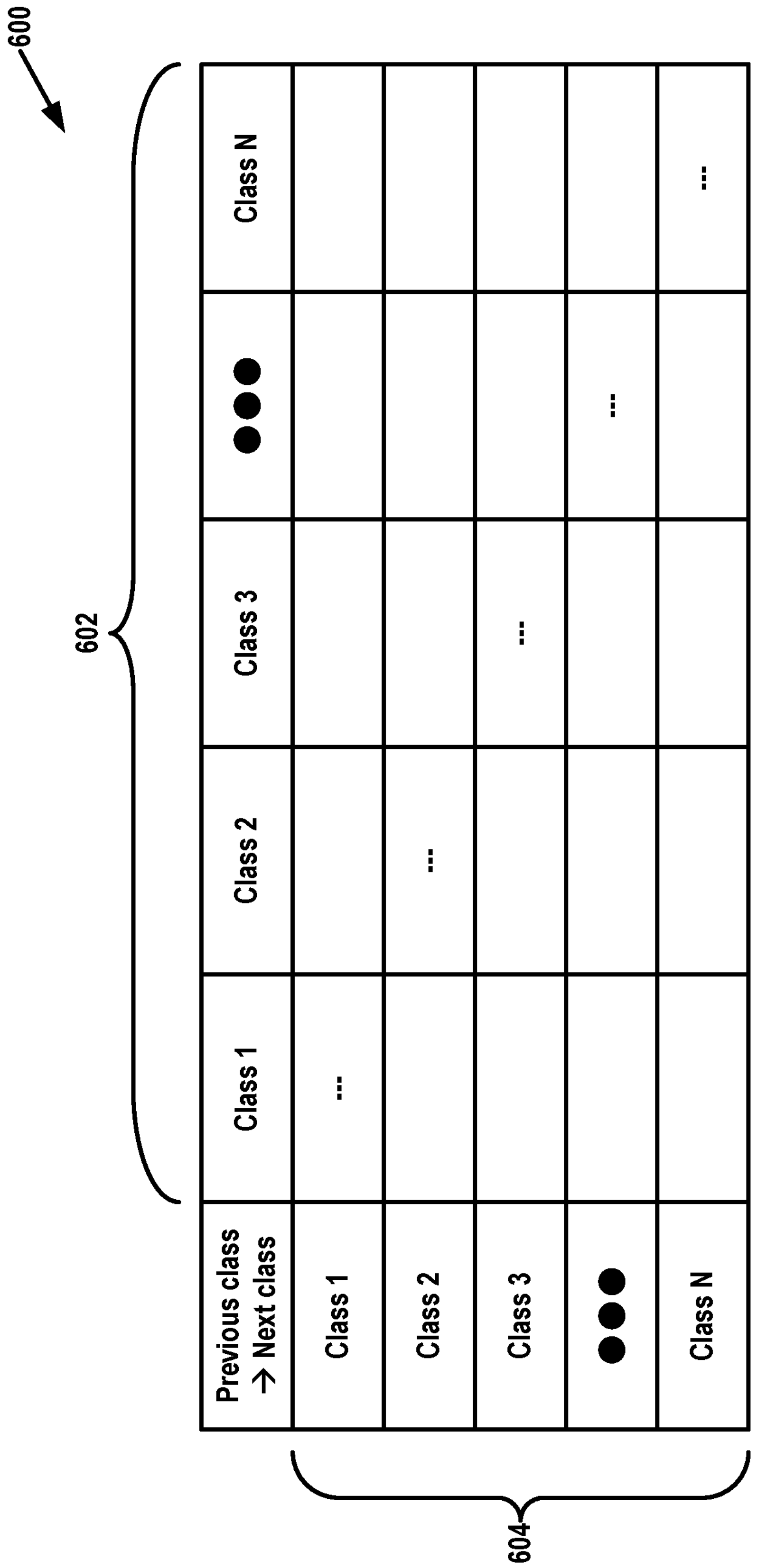
FIG. 6 is a conceptual diagram illustrating a first example context transition table for storing statistics regarding transitions between in contexts, in accordance with one or more aspects of this disclosure.

FIG. 6 is a conceptual diagram illustrating a first example context transition table 600 for storing statistics regarding transitions between in contexts, in accordance with one or more aspects of this disclosure. Context transition table 600 includes columns 602 corresponding to contexts and rows 604 corresponding to the contexts. Each cell in context transition table 600 indicate the number of times a current context of hearing instruments 102 has changed from the context corresponding to the row of the cell to the context corresponding to the column of the cell. For instance, in the example of FIG. 6, the rightmost cell of the first row of context transition table 600 may indicate the number of times the current context of hearing instruments 102 has changed from a first context ("Class 1") to a second context ("Class N").

Data in context transition table 600 may be used for a variety of purposes. For example, action unit 264 may predict a next context (or series of contexts) of hearing instruments 102 based on data in context transition table 600. Action unit 264 may then perform one or more actions based on the predicted next context (or series of contexts) of hearing instruments 102. For example, action unit 264 may determine, based on data in context transition table 600, that if context A is the current context then context B is likely to be the next context.

Action unit 264 may perform an action based on a prediction of the next context of hearing instruments 102. For example, action unit 264 may determine that the next context is associated with user 104 engaging in conversation in a noisy environment (e.g., because user 104 is walking in the direction of a restaurant). In this example, action unit 264 may send commands that cause a smartwatch or other device of user 104 to present a prompt that asks user 104 whether the user 104 would like to adapt the output settings of hearing instruments 102 to output settings associated with the next context. In this way, the output settings of hearing instruments 102 may be already changed to output settings appropriate for conversation in a noisy environment before user 104 enters the restaurant.

In some examples, action unit 264 uses statistics regarding at least one of the current context or predicted next context in determining an action to perform based on the prediction of the next context of hearing instruments 102. For example, action unit 264 may delay, at least until a minimum or median time spent in the current context has elapsed following onset of the current context, presentation of a prompt to user 104 asking whether to adapt the output settings of hearing instruments 102 to output settings associated with the next context.

Action unit 264 may predict the next context in one of a variety of ways. For example, action unit 264 may use a Markov model to predict the next context. In such examples, each context may correspond to a state of the Markov model. Action unit 264 may determine state transition probabilities of each state of the Markov model based on data in the context transition table 600. To use the Markov model, action unit 264 may determine which state (and therefore which context) the Markov model is most likely to transition to, given the current state (i.e., current context) and the state transition probabilities.

FIG. 7 is a conceptual diagram illustrating a second example context transition table 700 for storing statistics regarding transitions between in contexts, in accordance with one or more aspects of this disclosure. Context transition table 700 is based on values generated by an acoustic environment classifier and an activity monitor (AM). In other words, in the example of FIG. 7, a context may be defined by an acoustic environment determined by an acoustic classifier and an activity determined by an activity monitor. In the example of FIG. 7, the acoustic classifier may determine that a current acoustic environment is one of m classes and the activity monitor may determine that a current activity is one of n classes. Thus, table 700 may record the number of times the current context of hearing instruments 102 changes between any combination of acoustic environment and activity. Example classes of acoustic environments may include a moderate loud restaurant, quiet restaurant speech, large room speech, transportation noise with speech, transportation noise, default high-level environment, default low-level environment, wind noise, and so on. Example activity classes may include walking, running, biking, lying down, sitting or standing, aerobics, riding in a car, sit-stand transition, and so on.

Figure 8:
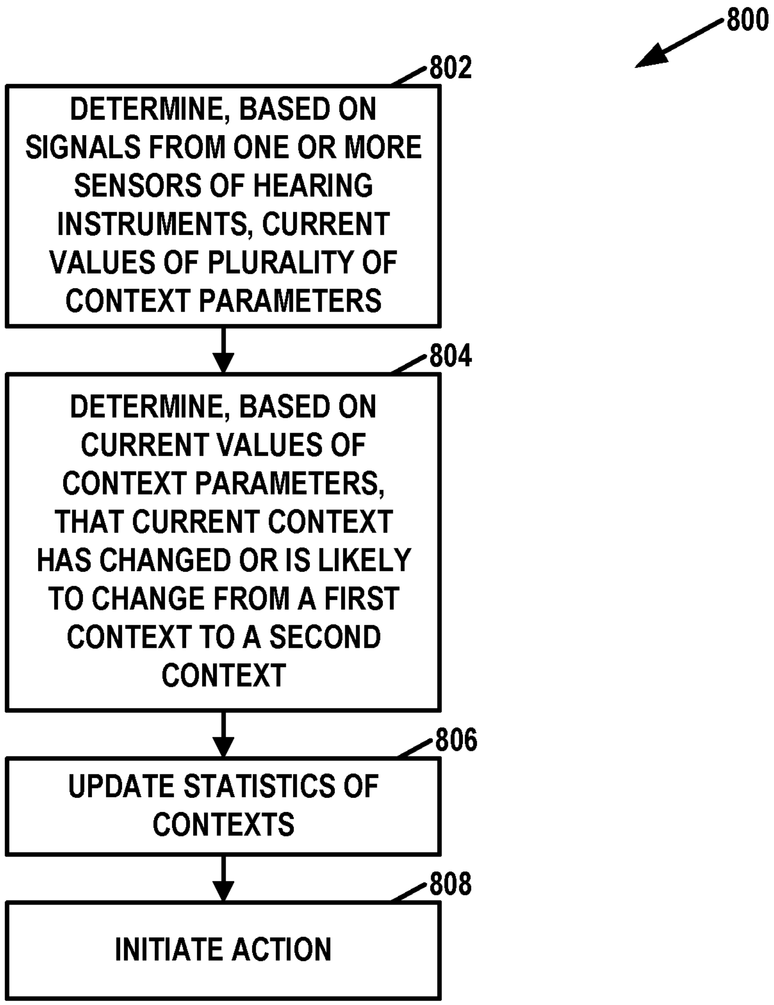
FIG. 8 is a flowchart illustrating an example operation, in accordance with one or more aspects of this disclosure.

FIG. 8 is a flowchart illustrating an example operation 800, in accordance with one or more aspects of this disclosure. The flowcharts of this disclosure are provided as examples. Other examples of this disclosure may include more, fewer, or different actions. Although this disclosure describes FIG. 8 and the other flowcharts of this disclosure with reference to the preceding figures, the techniques of this disclosure are not so limited. For instance, this disclosure describes actions as being performed by units described in FIG. 2, but such actions may be performed by one or more processors of processing system 114 (FIG. 1).

In the example of FIG. 8, processors 112 of processing system 114 may determine, based on signals from one or more sensors of one or more hearing instruments, current values of a plurality of context parameters (802). For instance, classifiers 268 may determine values of context parameters based on data from one or more sensors of one or more of hearing instruments 102. Example context parameters may include one or more of an acoustic environment parameter indicating a classification of an acoustic environment of one or more of hearing instruments 102, an activity parameter indicating an activity user 104 is performing, an own-voice parameter indicating whether user 104 is speaking, an emotion parameter indicating an emotional state of user 104, a brain engagement parameter indicating an engagement status of the brain of user 104, and so on.

Additionally, processors 112 may determine, based on the current values of the plurality of context parameters, that a current context of the one or more hearing instruments has changed or is likely to change from a first context of a plurality of contexts to a second context of the plurality of contexts (804). Each context in the plurality of contexts corresponds to a different unique combination of potential values of the plurality of context parameters. In some examples, processors 112 may use the current values of the context parameters to predict that the second context is likely to be the next context of hearing instruments 102.

Processors 112 may update statistics of the contexts (806). For each context of the plurality of contexts, the statistics of the context include statistics with respect to time the one or more hearing instruments spent in the context. For example, processors 112 may update the time-based statistics shown in FIG. 5.

In some examples, processors 112 may maintain in a buffer (e.g., short-term buffer 254 or intermediate-term buffer 256) of one or more hearing instruments 102, a series of entries corresponding to a series of time intervals each having a same duration (e.g., 15 minutes, 60 minutes, etc.). For each entry of the series of entries, the entry may include a timestamp that identifies the time interval corresponding to the entry. For each context of the plurality of contexts, the entry may include a time-in-context value indicating an amount of time hearing instruments 102 spent in the context during the time interval corresponding to the entry. As part of maintaining the buffer, processors 112 may update a time-in-context value indicating the amount of time hearing instruments 102 spent in the current context during a current time interval. Processors 112 may update the statistics of one or more of the contexts based on the time-in-context values in the entries of the buffer.

Furthermore, in some examples, the buffer discussed in the previous example may be considered a first buffer, the series of entries a first series of entries, the series of time intervals a first series of time intervals, and the duration a first duration. In some such examples, based on hearing instruments 102 being unable to communicate the entries of the first buffer (e.g., short-term buffer 254) to computing system 106 prior to a consolidation condition being reached, processors 112 may consolidate one or more entries in the first buffer into a second series of entries in a second buffer (e.g., intermediate-term buffer 256) of one or more of hearing instruments 102. The second buffer may comprise a second series of entries corresponding to a second series of time intervals each having a same second duration that is longer than the first duration (e.g., 60 minutes as opposed to 15 minutes). For each entry of the second series of entries, the entry of the second series of entries may include a timestamp that identifies the time interval corresponding to the entry of the second series of entries. For each context of the plurality of contexts, the entry of the second series of entries may include a time-in-context value indicating an amount of time one or more of hearing instruments 102 spent in the context corresponding to the entry of the second series of entries during the time interval corresponding to the entry of the second series of entries. As part of updating the statistics of each of the contexts, processors 112 may update the statistics of one or more of the contexts based on the time-in-context values in the entries of the second buffer. In some examples, processors 112 may maintain a third buffer (e.g., long-term buffer 258) of one or more of hearing instruments 102. Each entry of a plurality of entries in the third buffer may correspond to a different context of the plurality of contexts and may include a time-in-context value indicating a total time spent in the context corresponding to the entry after an initialization event for the third buffer. The initialization event for the third buffer may be an event in which time-in-context values in the third buffer are reset.

In some examples, processors 112 may update context-switching tables. That is, for each ordered combination of the contexts in the plurality of contexts, processors 112 may increment a counter for the ordered combination of the contexts based on a determination that the current context of the hearing instrument has changed from a first context of the ordered combination to the second context of the ordered combination. As part of determining that the current context is likely to change from the first context to the second context comprises processors 112 may determine, based on the counters for the ordered combinations of contexts, that the second context is a most likely context for the current context to change to given that the current context is the first context. For instance, if there are more transitions from the first context to the second context than any other context, processors 112 may determine that the second context is the most likely context for the current context to change to given that the current context is the first context.

Based on the determination that the current context of the one or more hearing instruments has changed or is likely to change from the first context to the second context, processors 112 may initiate, based on the statistics of at least one of the first or second contexts, one or more actions (808). For example, processors 112 may determine, based on the statistics of the second context whether to change current output settings of hearing instruments 102 to output settings associated with the second context. Based on a determination to change the current output settings of hearing instruments 102 to the output settings associated with the second context, processors 112 may change the output settings of hearing instruments 102 to the output settings associated with the second context. For example, processors 112 may change the output gain, settings for frequency compression, settings for frequency translation, settings for noise reduction, and so on. On the other hand, based on a determination not to change the current output settings of hearing instruments 102 to the output settings associated with the second context, processors 112 do not change the output settings of hearing instruments 102 to the output settings associated with the second context.

In some examples, processors 112 may initiate other actions based on the statistics of the contexts instead of determining whether or not to change the output settings of hearing instruments 102. For example, processors 112 may cause a computing device (e.g., a smartwatch, smartphone, accessory device, etc.) to display a user interface that asks user 104 whether to change the current output settings of hearing instruments 102 to output settings associated with a predicted next context. In some examples, processors 112 may use the statistics of the contexts for a population of user to identify clusters of the users. Processors 112 may perform various actions in response to determining that user 104 is part of a specific cluster, such as recommend specific products, predict next contexts of hearing instruments 102 of user 104, and so on. In some examples, processors 112 may cause a device (e.g., a smartphone, smartwatch, hearing instruments 102, etc.) to prompt user 104 whether to change current output settings of the one or more hearing instruments to output settings associated with the second context. For instance, in response to processors 112 determining that the current context is likely to change from the first context to the second context, processors 112 may send a command to a smartwatch of user 104 that allows user 104 to tap the face or a button of the smartwatch to change the output settings of hearing instruments 102. In other examples, processors 112 may cause devices to output other types of user interfaces or present other prompts.

In some examples, processors 112 may initiate an action of causing a device (e.g., smartwatch, smartphone, hearing instruments 102) to start a fitness tracking session based on the statistics of the contexts. For instance, in one example, the contexts may include a running context. In this example, processors 112 may determine, based on the time-based statistics for the running context, a histogram in which each location on an x-axis corresponds to a different time duration that hearing instruments 102 spent in the running context. Furthermore, there may be a bimodal distribution in the histogram, with a first peak corresponding to short bursts of activity (e.g., running downstairs to turn off a tea kettle) and a second peak corresponding to times when user 104 is running for excise. In this example, it would only be advantageous to change output settings of hearing instruments 102 to output settings corresponding to the running context if an amount of time spent in the running context is longer than the time associated with the first peak. Similarly, processors 112 may initiate (or prompt user 104 to initiate) an exercise tracking feature (e.g., track heart rate, distance traveled, location on a map, etc.) if the amount of time spent in the running context is longer than the time associated with the first peak.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user. Furthermore, it is to be understood that discussion in this disclosure of hearing instrument 102A (including components thereof, such as an in-ear assembly, speaker 108A, microphone 110A, processors 112A, etc.) may apply with respect to hearing instrument 102B.

The following is a non-limiting list of clauses in accordance with one or more techniques of this disclosure.

Clause 1. A method comprising: determining, by one or more processors of a processing system, based on signals from one or more sensors of one or more hearing instruments, current values of a plurality of context parameters, wherein the processors are implemented in circuitry; determining, by the one or more processors, based on the current values of the plurality of context parameters, that a current context of the one or more hearing instruments has changed or is likely to change from a first context of a plurality of contexts to a second context of the plurality of contexts, wherein each context in the plurality of contexts corresponds to a different unique combination of potential values of the plurality of context parameters; updating, by the one or more processors, statistics of the contexts, wherein for each context of the plurality of contexts, the statistics of the context include statistics with respect to time the one or more hearing instruments spent in the context; and based on the determination that the current context of the one or more hearing instruments has changed or is likely to change from the first context to the second context, initiating, by the one or more processors, based on the statistics of at least one of the first or second contexts, one or more actions.

Clause 2. The method of claim 1, wherein initiating the one or more actions comprises: determining, by the one or more processors, based on the statistics of at least one of the first or second contexts whether to change current output settings of the one or more hearing instruments to output settings associated with the second context; and based on a determination to change the current output settings of the one or more hearing instruments, changing the current output settings of the one or more hearing instruments to the output settings associated with the second context.

Clause 3. The method of claim 1, wherein initiating the one or more actions comprises: causing, by the one or more processors, a device to prompt a user of the one or more hearing instruments whether to change current output settings of the one or more hearing instruments to output settings associated with the second context.

Clause 4. The method of any of claims 1-3, further comprising: for each ordered combination of the contexts in the plurality of contexts, incrementing a counter for the ordered combination of the contexts based on a determination that the current context of the one or more hearing instruments has changed from a first context of the ordered combination to the second context of the ordered combination.

Clause 5. The method of claim 4, wherein determining that the current context is likely to change from the first context to the second context comprises determining, by the one or more processors, based on the counters for the ordered combinations of contexts, that the second context is a most likely context for the current context to change to given that the current context is the first context.

Clause 6. The method of any of claims 1-5, wherein the method further comprises maintaining, by the one or more processors, in a buffer of the one or more hearing instruments, a series of entries corresponding to a series of time intervals each having a same duration, wherein: for each entry of the series of entries: the entry includes a timestamp that identifies the time interval corresponding to the entry, and for each context of the plurality of contexts, the entry includes a time-in-context value indicating an amount of time the one or more hearing instruments spent in the context during the time interval corresponding to the entry, maintaining the buffer comprises, updating a time-in-context value indicating the amount of time the one or more hearing instruments spent in the current context during a current time interval, and updating the statistics of each of the contexts comprises updating the statistics of one or more of the contexts based on the time-in-context values in the entries of the buffer.

Clause 7. The method of claim 6, wherein: the buffer is a first buffer, the series of entries is a first series of entries, the series of time intervals is a first series of time intervals, the duration is a first duration, the method further comprises, based on the one or more hearing instruments being unable to communicate the entries of the first buffer to a computing system prior to a consolidation condition being reached, consolidating one or more entries in the first buffer into a second series of entries in a second buffer of the one or more hearing instruments, the second buffer comprises a second series of entries corresponding to a second series of time intervals each having a same second duration that is longer than the first duration, for each entry of the second series of entries: the entry of the second series of entries includes a timestamp that identifies the time interval corresponding to the entry of the second series of entries, and for each context of the plurality of contexts, the entry of the second series of entries includes a time-in-context value indicating an amount of time the one or more hearing instruments spent in the context corresponding to the entry of the second series of entries during the time interval corresponding to the entry of the second series of entries, and updating the statistics of each of the contexts comprises updating the statistics of one or more of the contexts based on the time-in-context values in the entries of the second buffer.

Clause 8. The method of claim 7, wherein the method further comprises: maintaining a third buffer of the one or more hearing instruments, each entry of a plurality of entries in the third buffer corresponds to a different context of the plurality of contexts and includes a time-in-context value indicating a total time spent in the context corresponding to the entry after an initialization event for the third buffer.

Clause 9. The method of any of claims 1-8, wherein the context parameters include one or more of: an acoustic environment parameter indicating a classification of an acoustic environment of the one or more hearing instruments, an activity parameter indicating an activity a user of the one or more hearing instruments is performing, an own-voice parameter indicating whether the user of the one or more hearing instruments is speaking, an emotion parameter indicating an emotional state of the user of the one or more hearing instruments, or a brain engagement parameter indicating an engagement status of the brain of the user of the one or more hearing instruments.

Clause 10. The method of any of claims 1-9, wherein: the one or more hearing instruments are current hearing instruments, the method further comprises: obtaining, by the one or more processors, context statistics data for a plurality of sets of hearing instruments, wherein: each set of hearing instruments comprises one or more hearing instruments associated with a different user in a population of users, for each set of hearing instruments in the plurality of sets of hearing instruments, the context statistics data for the set of hearing instruments includes statistics with respect to time the set of hearing instruments spent in each of the contexts of the plurality of contexts; identifying, by the one or more processors, based on the context statistics data for the plurality of sets of hearing instruments, a plurality of clusters of sets of hearing instruments that are similar with respect to time spent in each of the contexts of the plurality of contexts; and determining, by the one or more processors, a cluster in the plurality of clusters to which the current hearing instruments belong, and initiating the one or more actions comprises initiating, by the one or more processors, the one or more actions based on the cluster to which the current hearing instruments belong.

Clause 11. A system comprising: one or more storage devices configured to store data based on signals from one or more sensors of one or more hearing instruments; and a processing system comprising one or more processors configured to: determine, based on data based on the signals from the one or more sensors of the one or more hearing instruments, current values of a plurality of context parameters, wherein the processors are implemented in circuitry; determine, based on the current values of the plurality of context parameters, that a current context of the one or more hearing instruments has changed or is likely to change from a first context of a plurality of contexts to a second context of the plurality of contexts, wherein each context in the plurality of contexts corresponds to a different unique combination of potential values of the plurality of context parameters; update statistics of the contexts, wherein for each context of the plurality of contexts, the statistics of the context include statistics with respect to time the one or more hearing instruments spent in the context; and based on the determination that the current context of the one or more hearing instruments has changed or is likely to change from the first context to the second context, initiate, based on the statistics of at least one of the first or second contexts, one or more actions.

Clause 12. The system of claim 11, wherein the one or more processors are configured to, as part of initiating the one or more actions: determine, based on the statistics of at least one of the first or second contexts whether to change current output settings of the one or more hearing instruments to output settings associated with the second context; and based on a determination to change the current output settings of the one or more hearing instruments, change the current output settings of the one or more hearing instruments to the output settings associated with the second context.

Clause 13. The system of claim 11, wherein the one or more processors are configured to, as part of initiating the one or more actions: cause a device to prompt a user of the one or more hearing instruments whether to change current output settings of the one or more hearing instruments to output settings associated with the second context.

Clause 14. The system of any of claims 11-13, wherein the one or more processors are further configured to: for each ordered combination of the contexts in the plurality of contexts, increment a counter for the ordered combination of the contexts based on a determination that the current context of the one or more hearing instruments has changed from a first context of the ordered combination to the second context of the ordered combination.

Clause 15. The system of claim 14, wherein the one or more processors are configured to, as part of determining that the current context is likely to change from the first context to the second context, determine, based on the counters for the ordered combinations of contexts, that the second context is a most likely context for the current context to change to given that the current context is the first context.

Clause 16. The system of any of claims 11-15, wherein the one or more processors are further configured to maintain, in a buffer of the one or more hearing instruments, a series of entries corresponding to a series of time intervals each having a same duration, wherein: for each entry of the series of entries: the entry includes a timestamp that identifies the time interval corresponding to the entry, and for each context of the plurality of contexts, the entry includes a time-in-context value indicating an amount of time the one or more hearing instruments spent in the context during the time interval corresponding to the entry, the processors are configured to, as part of maintaining the buffer, update a time-in-context value indicating the amount of time the one or more hearing instruments spent in the current context during a current time interval, and the one or more processors are configured to, as part of updating the statistics of each of the contexts, update the statistics of one or more of the contexts based on the time-in-context values in the entries of the buffer.

Clause 17. The system of claim 16, wherein: the buffer is a first buffer, the series of entries is a first series of entries, the series of time intervals is a first series of time intervals, the duration is a first duration, the one or more processors are further configured to, based on the one or more hearing instruments being unable to communicate the entries of the first buffer to a computing system prior to a consolidation condition being reached, consolidate one or more entries in the first buffer into a second series of entries in a second buffer of the one or more hearing instruments, wherein: the second buffer comprises a second series of entries corresponding to a second series of time intervals each having a same second duration that is longer than the first duration, for each entry of the second series of entries: the entry of the second series of entries includes a timestamp that identifies the time interval corresponding to the entry of the second series of entries, and for each context of the plurality of contexts, the entry of the second series of entries includes a time-in-context value indicating an amount of time the one or more hearing instruments spent in the context corresponding to the entry of the second series of entries during the time interval corresponding to the entry of the second series of entries, the one or more processors are configured to, as part of updating the statistics of each of the contexts, update the statistics of one or more of the contexts based on the time-in-context values in the entries of the second buffer.

Clause 18. The system of any of claims 11-17, wherein the context parameters include one or more of: an acoustic environment parameter indicating a classification of an acoustic environment of the one or more hearing instruments, an activity parameter indicating an activity a user of the one or more hearing instruments is performing, an own-voice parameter indicating whether the user of the one or more hearing instruments is speaking, an emotion parameter indicating an emotional state of the user of the one or more hearing instruments, or a brain engagement parameter indicating an engagement status of the brain of the user of the one or more hearing instruments.

Clause 19. The system of any of claims 11-18, wherein: the one or more hearing instruments are current hearing instruments, the one or more processors are further configured to: obtain context statistics data for a plurality of sets of hearing instruments, wherein: each set of hearing instruments comprises one or more hearing instruments associated with a different user in a population of users, for each set of hearing instruments in the plurality of sets of hearing instruments, the context statistics data for the set of hearing instruments includes statistics with respect to time the set of hearing instruments spent in each of the contexts of the plurality of contexts; identify, based on the context statistics data for the plurality of sets of hearing instruments, a plurality of clusters of sets of hearing instruments that are similar with respect to time spent in each of the contexts of the plurality of contexts; and determine a cluster in the plurality of clusters to which the current hearing instruments belong, and the one or more processors are configured to initiate the one or more actions based on the cluster to which the current hearing instruments belong.

Clause 20. A non-transitory computer-readable storage medium having instructions stored thereon that, when executed cause one or more processors to: determine, based on signals from one or more sensors of one or more hearing instruments, current values of a plurality of context parameters, wherein the processors are implemented in circuitry; determine, based on the current values of the plurality of context parameters, that a current context of the one or more hearing instruments has changed or is likely to change from a first context of a plurality of contexts to a second context of the plurality of contexts, wherein each context in the plurality of contexts corresponds to a different unique combination of potential values of the plurality of context parameters; update, statistics of the contexts, wherein for each context of the plurality of contexts, the statistics of the context include statistics with respect to time the one or more hearing instruments spent in the context; and based on the determination that the current context of the one or more hearing instruments has changed or is likely to change from the first context to the second context, initiate, based on the statistics of at least one of the first or second contexts, one or more actions.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair cable, digital subscriber line (DSL), or wireless technologies such as infrared, radio, and microwave, then the coaxial cable, fiber optic cable, twisted pair cable, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. The terms disk and disc, as used herein, may include compact discs (CDs), optical discs, digital versatile discs (DVDs), floppy disks, Blu-ray discs, hard disks, and other types of spinning data storage media. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method comprising:

determining, by one or more processors of a processing system, based on signals from one or more sensors of one or more hearing instruments, current values of a plurality of context parameters, wherein the one or more processors are implemented in circuitry;

determining, by the one or more processors, based on the current values of the plurality of context parameters, that a current context of the one or more hearing instruments has changed or is likely to change from a first context of a plurality of contexts to a second context of the plurality of contexts, wherein each context in the plurality of contexts corresponds to a different unique combination of potential values of the plurality of context parameters;

updating, by the one or more processors, statistics of the contexts, wherein for each context of the plurality of contexts, the statistics of the context include statistics with respect to time the one or more hearing instruments spent in the context; and based on a determination that the current context of the one or more hearing instruments has changed or is likely to change from the first context to the second context, initiating, by the one or more processors, based on the statistics of at least one of the first or second contexts, one or more actions, wherein initiating the one or more actions comprises:

determining, based on the statistics of at least one of the first or second contexts, whether to change current output settings of the one or more hearing instruments to output settings associated with the second context; and based on a determination to change the current output settings of the one or more hearing instruments, changing the current output settings of the one or more hearing instruments to the output settings associated with the second context.

2. The method of claim 1, wherein initiating the one or more actions further comprises:

causing, by the one or more processors, a device to prompt a user of the one or more hearing instruments whether to change the current output settings of the one or more hearing instruments to the output settings associated with the second context.

3. The method of claim 1, further comprising:

for each ordered combination of a plurality of ordered combinations of the contexts in the plurality of contexts, incrementing a counter for the ordered combination based on a determination that the current context of the one or more hearing instruments has changed from one context of the ordered combination to another context of the ordered combination.

4. The method of claim 3, wherein determining that the current context is likely to change from the first context to the second context comprises determining, by the one or more processors, based on counters for the plurality of ordered combinations of the contexts, that the second context is a most likely context for the current context to change to given that the current context is the first context.

5. The method of claim 1, wherein the method further comprises maintaining, by the one or more processors, in a buffer of the one or more hearing instruments, a series of entries corresponding to a series of time intervals each having a same duration, wherein:

for each entry of the series of entries:

the entry includes a timestamp that identifies the time interval corresponding to the entry, and for each context of the plurality of contexts, the entry includes a time-in-context value indicating an amount of time the one or more hearing instruments spent in the context during the time interval corresponding to the entry, maintaining the series of entries comprises, updating a time-in-context value indicating the amount of time the one or more hearing instruments spent in the current context during a current time interval, and updating the statistics of the contexts comprises updating the statistics of one or more of the contexts based on time-in-context values in the entries of the buffer.

6. The method of claim 5, wherein:

the buffer is a first buffer, the series of entries is a first series of entries, the series of time intervals is a first series of time intervals, and the duration is a first duration, the method further comprises, based on the one or more hearing instruments being unable to communicate the entries of the first buffer to a computing system prior to a consolidation condition being reached, consolidating one or more entries in the first buffer into a second series of entries in a second buffer of the one or more hearing instruments, the second series of entries corresponds to a second series of time intervals each having a same second duration that is longer than the first duration, for each entry of the second series of entries:

the entry of the second series of entries includes a timestamp that identifies a time interval corresponding to the entry of the second series of entries, and for each context of the plurality of contexts, the entry of the second series of entries includes a time-in-context value indicating an amount of time the one or more hearing instruments spent in the context corresponding to the entry of the second series of entries during the time interval corresponding to the entry of the second series of entries, and updating the statistics of the contexts comprises updating the statistics of at least one of the contexts based on the time-in-context values in the entries of the second buffer.

7. The method of claim 6, wherein the method further comprises:

maintaining a third buffer of the one or more hearing instruments, each entry of a plurality of entries in the third buffer corresponds to a different context of the plurality of contexts and includes a time-in-context value indicating a total time spent in the context corresponding to the entry after an initialization event for the third buffer.

8. The method of claim 1, wherein the plurality of context parameters includes one or more of:

an acoustic environment parameter indicating a classification of an acoustic environment of the one or more hearing instruments, an activity parameter indicating an activity a user of the one or more hearing instruments is performing, an own-voice parameter indicating whether the user of the one or more hearing instruments is speaking, an emotion parameter indicating an emotional state of the user of the one or more hearing instruments, or a brain engagement parameter indicating an engagement status of a brain of the user of the one or more hearing instruments.

9. The method of claim 1, wherein:

the one or more hearing instruments are one or more current hearing instruments, the method further comprises:

obtaining, by the one or more processors, context statistics data for a plurality of sets of hearing instruments, wherein:

each set of hearing instruments in the plurality of sets of hearing instruments comprises one or more hearing instruments associated with a different user in a population of users, for each set of hearing instruments in the plurality of sets of hearing instruments, the context statistics data for the set of hearing instruments includes statistics with respect to time the set of hearing instruments spent in each of the contexts of the plurality of contexts;

identifying, by the one or more processors, based on the context statistics data for the plurality of sets of hearing instruments, a plurality of clusters of sets of hearing instruments that are similar with respect to time spent in each of the contexts of the plurality of contexts; and determining, by the one or more processors, a cluster in the plurality of clusters to which the one or more current hearing instruments belong, and initiating the one or more actions comprises initiating, by the one or more processors, the one or more actions based on the cluster to which the one or more current hearing instruments belong.

10. A system comprising:

one or more storage devices configured to store data based on signals from one or more sensors of one or more hearing instruments; and a processing system comprising one or more processors configured to:

determine, based on the data based on the signals from the one or more sensors of the one or more hearing instruments, current values of a plurality of context parameters, wherein the one or more processors are implemented in circuitry;

determine, based on the current values of the plurality of context parameters, that a current context of the one or more hearing instruments has changed or is likely to change from a first context of a plurality of contexts to a second context of the plurality of contexts, wherein each context in the plurality of contexts corresponds to a different unique combination of potential values of the plurality of context parameters;

update statistics of the contexts, wherein for each context of the plurality of contexts, the statistics of the context include statistics with respect to time the one or more hearing instruments spent in the context; and based on a determination that the current context of the one or more hearing instruments has changed or is likely to change from the first context to the second context, initiate, based on the statistics of at least one of the first or second contexts, one or more actions, wherein to initiate the one or more actions, the processing system is configured to:

determine, based on the statistics of at least one of the first or second contexts, whether to change current output settings of the one or more hearing instruments to output settings associated with the second context; and based on a determination to change the current output settings of the one or more hearing instruments, change the current output settings of the one or more hearing instruments to the output settings associated with the second context.

11. The system of claim 10, wherein the one or more processors are configured to, as part of initiating the one or more actions:

cause a device to prompt a user of the one or more hearing instruments whether to change the current output settings of the one or more hearing instruments to the output settings associated with the second context.

12. The system of claim 10, wherein the one or more processors are further configured to:

for each ordered combination of a plurality of ordered combinations of the contexts in the plurality of contexts, increment a counter for the ordered combination based on a determination that the current context of the one or more hearing instruments has changed from one context of the ordered combination to another context of the ordered combination.

13. The system of claim 12, wherein the one or more processors are configured to, as part of determining that the current context is likely to change from the first context to the second context, determine, based on the counters for the plurality of ordered combinations of the contexts, that the second context is a most likely context for the current context to change to given that the current context is the first context.

14. The system of claim 10, wherein the one or more processors are further configured to maintain, in a buffer of the one or more hearing instruments, a series of entries corresponding to a series of time intervals each having a same duration, wherein:

for each entry of the series of entries:

the entry includes a timestamp that identifies the time interval corresponding to the entry, and for each context of the plurality of contexts, the entry includes a time-in-context value indicating an amount of time the one or more hearing instruments spent in the context during the time interval corresponding to the entry, the one or more processors are configured to, as part of maintaining the series of entries, update a time-in-context value indicating the amount of time the one or more hearing instruments spent in the current context during a current time interval, and the one or more processors are configured to, as part of updating the statistics of the contexts, update the statistics of one or more of the contexts based on the time-in-context values in the entries of the buffer.

15. The system of claim 14, wherein:

the buffer is a first buffer, the series of entries is a first series of entries, the series of time intervals is a first series of time intervals, and the duration is a first duration, the one or more processors are further configured to, based on the one or more hearing instruments being unable to communicate the entries of the first buffer to a computing system prior to a consolidation condition being reached, consolidate one or more entries in the first buffer into a second series of entries in a second buffer of the one or more hearing instruments, wherein:

the second series of entries corresponds to a second series of time intervals each having a same second duration that is longer than the first duration, for each entry of the second series of entries:

the entry of the second series of entries includes a timestamp that identifies the time interval corresponding to the entry of the second series of entries, and for each context of the plurality of contexts, the entry of the second series of entries includes a time-in-context value indicating an amount of time the one or more hearing instruments spent in the context corresponding to the entry of the second series of entries during the time interval corresponding to the entry of the second series of entries, the one or more processors are configured to, as part of updating the statistics of the contexts, update the statistics of at least one or more of the contexts based on the time-in-context values in the entries of the second buffer.

16. The system of claim 10, wherein the plurality of context parameters includes one or more of:

an acoustic environment parameter indicating a classification of an acoustic environment of the one or more hearing instruments, an activity parameter indicating an activity a user of the one or more hearing instruments is performing, an own-voice parameter indicating whether the user of the one or more hearing instruments is speaking, an emotion parameter indicating an emotional state of the user of the one or more hearing instruments, or a brain engagement parameter indicating an engagement status of the brain of the user of the one or more hearing instruments.

17. The system of claim 10, wherein:

the one or more hearing instruments are current hearing instruments, the one or more processors are further configured to:

obtain context statistics data for a plurality of sets of hearing instruments, wherein:

each set of hearing instruments in the plurality of sets of hearing instruments comprises one or more hearing instruments associated with a different user in a population of users, for each set of hearing instruments in the plurality of sets of hearing instruments, the context statistics data for the set of hearing instruments includes statistics with respect to time the set of hearing instruments spent in each of the contexts of the plurality of contexts;

identify, based on the context statistics data for the plurality of sets of hearing instruments, a plurality of clusters of sets of hearing instruments that are similar with respect to time spent in each of the contexts of the plurality of contexts; and determine a cluster in the plurality of clusters to which the current hearing instruments belong, and the one or more processors are configured to initiate the one or more actions based on the cluster to which the current hearing instruments belong.

18. A non-transitory computer-readable storage medium having instructions stored thereon that, when executed by one or more processors, cause a processing system to:

determine, based on signals from one or more sensors of one or more hearing instruments, current values of a plurality of context parameters, wherein the one or more processors are implemented in circuitry;

determine, based on the current values of the plurality of context parameters, that a current context of the one or more hearing instruments has changed or is likely to change from a first context of a plurality of contexts to a second context of the plurality of contexts, wherein each context in the plurality of contexts corresponds to a different unique combination of potential values of the plurality of context parameters;

update statistics of the contexts, wherein for each context of the plurality of contexts, the statistics of the context include statistics with respect to time the one or more hearing instruments spent in the context; and based on a determination that the current context of the one or more hearing instruments has changed or is likely to change from the first context to the second context, initiate, based on the statistics of at least one of the first or second contexts, one or more actions, wherein to initiate the one or more actions, execution of the instructions causes the processing system to:

determine, based on the statistics of at least one of the first or second contexts, whether to change current output settings of the one or more hearing instruments to output settings associated with the second context; and based on a determination to change the current output settings of the one or more hearing instruments, change the current output settings of the one or more hearing instruments to the output settings associated with the second context.

* * * * *